US009857475B2

(12) United States Patent
Yunck

(10) Patent No.: US 9,857,475 B2
(45) Date of Patent: Jan. 2, 2018

(54) CELLULAR INTERFEROMETER FOR CONTINUOUS EARTH REMOTE OBSERVATION (CICERO)

(75) Inventor: Thomas Patrick Yunck, Pasadena, CA (US)

(73) Assignee: GEOOPTICS, INC., Pasadena, CA (US)

( * ) Notice: Subject to any disclaimer, the term of this patent is extended or adjusted under 35 U.S.C. 154(b) by 1128 days.

(21) Appl. No.: 12/206,927

(22) Filed: Sep. 9, 2008

(65) Prior Publication Data
US 2010/0063733 A1    Mar. 11, 2010

(51) Int. Cl.
G01S 19/14     (2010.01)
G01S 19/29     (2010.01)
B64G 1/10      (2006.01)

(52) U.S. Cl.
CPC .............. *G01S 19/14* (2013.01); *G01S 19/29* (2013.01); *B64G 1/1021* (2013.01); *B64G 1/1085* (2013.01)

(58) Field of Classification Search
CPC ............... B64G 1/1021; B64G 1/1085; B64G 2001/1035; B64G 2001/1042
USPC ..................................................... 244/158.4
See application file for complete search history.

(56) References Cited

U.S. PATENT DOCUMENTS

| 4,602,257 A * | 7/1986 | Grisham | G01S 13/9035 342/25 F |
| 4,727,373 A * | 2/1988 | Hoover | 342/25 F |
| 4,854,527 A * | 8/1989 | Draim | B64G 1/1007 244/158.4 |
| 4,990,925 A * | 2/1991 | Edelsohn et al. | 342/424 |
| 5,373,302 A * | 12/1994 | Wu | H01Q 5/45 343/781 CA |
| 5,546,087 A * | 8/1996 | Martin Neira | 342/120 |
| 5,552,787 A * | 9/1996 | Schuler et al. | 342/25 A |

(Continued)

OTHER PUBLICATIONS

McCormick et al.; Community Initiative for Continuing Earth Radio Occultation CICERO; Aug. 13-16, 2007; 21st Annual Conference on Small Satellites; American Institute of Aeronautics and Astronautics (AIAA)/Utah State University (USU).*

(Continued)

*Primary Examiner* — Tien Q Dinh
*Assistant Examiner* — Michael A. Fabula
(74) *Attorney, Agent, or Firm* — Daylight Law, P.C.

(57) ABSTRACT

A fleet of small spacecraft ("cells") in low Earth orbit combine to form an integrated Earth observing system providing many observations previously requiring distinct sensing systems. Each cell performs a few relatively primitive functions, including emission, reception, sampling, and recording of radio and microwave signals. Each cell observes over a spherical field of view, samples the received signals independently at many small antenna elements, and stores the data from each element. Data from all cells are sent to a common location where they can be combined in diverse ways to realize a wide range of observing functions. These functions may include ionosphere and gravity field mapping; atmospheric radio occultation; ocean, ice, and land altimetry; ocean scatterometry; synthetic aperture radar (SAR) imaging; radar sensing of soil moisture, land cover, and geological surface properties; and interferometric SAR sensing of surface change. The system can also provide real-time messaging, navigation and surveillance functions.

32 Claims, 16 Drawing Sheets

The "arc-and-ring" orbit configuration for EGO-GXO.

Further details of the proposed CICERO cell.

(56) References Cited

U.S. PATENT DOCUMENTS

| | | | | |
|---|---|---|---|---|
| 5,582,367 | A * | 12/1996 | Castiel | B64G 1/1007 244/158.4 |
| 5,608,404 | A * | 3/1997 | Burns et al. | 342/25 A |
| 5,675,081 | A * | 10/1997 | Solheim | G01W 1/00 324/640 |
| 5,911,389 | A * | 6/1999 | Drake | B64G 1/1007 244/158.4 |
| 5,931,417 | A * | 8/1999 | Castiel | 244/158.4 |
| 5,936,588 | A * | 8/1999 | Rao et al. | 343/754 |
| 6,011,505 | A * | 1/2000 | Poehler et al. | 342/25 C |
| 6,102,335 | A * | 8/2000 | Castiel | B64G 1/1007 244/158.4 |
| 6,130,644 | A * | 10/2000 | Massonnet | 342/453 |
| 6,264,143 | B1 * | 7/2001 | Massonnet | G01S 13/003 244/158.4 |
| 6,388,606 | B1 * | 5/2002 | Keydel et al. | 342/25 R |
| 6,400,306 | B1 * | 6/2002 | Nohara et al. | 342/25 R |
| 6,452,532 | B1 * | 9/2002 | Grisham | G01S 13/9023 342/191 |
| 6,552,678 | B1 * | 4/2003 | Adragna | G01S 13/9023 342/191 |
| 6,586,741 | B2 * | 7/2003 | Glass et al. | 250/342 |
| 6,844,844 | B1 * | 1/2005 | Aguttes | 342/354 |
| 6,864,828 | B1 * | 3/2005 | Golubiewski | G01S 13/9023 342/147 |
| 6,868,316 | B1 * | 3/2005 | Stevens | G05D 1/0883 244/171 |
| 6,870,500 | B2 | 3/2005 | Suess et al. | |
| 6,911,931 | B2 * | 6/2005 | Vincent | 342/25 C |
| 6,965,351 | B1 * | 11/2005 | Miller | H01Q 1/288 343/781 CA |
| 7,196,653 | B2 * | 3/2007 | Hall et al. | 342/25 F |
| 7,348,917 | B2 * | 3/2008 | Stankwitz et al. | 342/25 R |
| 7,414,573 | B2 * | 8/2008 | Murphy | 342/357.21 |
| 2003/0006927 | A1 * | 1/2003 | Moreira | B64G 1/1021 342/25 R |
| 2003/0228867 | A1 * | 12/2003 | Castiel | B64G 1/1007 455/427 |
| 2004/0065781 | A1 * | 4/2004 | Bingaman | B64G 1/242 244/158.4 |
| 2005/0038602 | A1 * | 2/2005 | Uchida | B64G 1/242 702/2 |
| 2005/0163201 | A1 * | 7/2005 | Krasner | G01S 19/30 375/150 |
| 2007/0250267 | A1 * | 10/2007 | Jaeger | B64G 1/1085 701/531 |
| 2008/0099625 | A1 * | 5/2008 | Yocom | B64G 1/1085 244/158.4 |
| 2008/0237399 | A1 * | 10/2008 | Caplin | B64G 1/1085 244/158.4 |
| 2008/0251645 | A1 * | 10/2008 | Li | B64G 1/1085 244/158.4 |
| 2009/0152402 | A1 * | 6/2009 | Massonnet | B64G 1/1021 244/158.2 |
| 2010/0309313 | A1 * | 12/2010 | Antikidis | B64G 1/1021 348/144 |

OTHER PUBLICATIONS

Community Initiative for Continuing Earth Radio Occultation CICERO Powerpoint presentation; Aug. 13-16, 2007; 21st Annual Conference on Small Satellites; American Institute of Aeronautics and Astronautics (AIAA)/Utah State University (USU).*

T. P. Yunck, G. A. Hajj, 2003 Global navigation satellite sounding of the atmosphere and GNSS altimetry: prospects for geosciences, Proceedings of IUGG General Assembly, Jul. 2003, Sapporo, Japan. 0065-844 0065 8448.* archive.org capture of smallsat.org from Aug. 28, 2007; <https://web-beta.archive.org/web/20070828074545/http://www.smallat.org:80/>.*

Brinton, Turner; Scientists use GPS signals to measure Earth's atmosphere; Oct. 10, 2007; Space.com; <http://www.space.com/4452-scientists-gps-signals-measure-earth-atmosphere.html>.*

Archive.org capture of broadreachengineering.com from Aug. 4, 2007; <https://web-beta.archive.org/web/20070804232407/broadreachengineering.com>.*

Cosmo-SkyMed, Telespazio, Nov. 2008, http://www.telespazio.it/cosmo.html.

Current Missions—Prepped for Launch, Jason-2, NASA, Jun. 2008, http://www.nasa.gov/mission_pages/ostm/main/index.html.

DigitalGlobe Products, DigitalGlobe, Aug. 2008, http://www.digitalglobe.com/.

Field-programmable gate array, Wikipedia, Nov. 2007, http://en.wikipedia.org/wiki/Field-programmable_gate_array.

Gleason, Processing of bistatically reflected GPS signals from low Earth orbit for the purpose of ocean remote sensing, IEEE Transactions on Geoscience and Remote Sensing, Jun. 2005, vol. 43, No. 6, pp. 1229-1241.

Glonass—Summary, Space and Tech, 2001, Archived Aug. 2008, http://www.spaceandtech.com/spacedata/constellations/glonass_consum.shtml.

GOES POES Program, NASA, Jul. 2008, http://goespoes.gsfc.nasa.gov/.

Grace, University of Texas, Apr. 2008, http://www.csr.utexas.edu/grace/.

Home page, Cosmic, Apr. 2008, http://www.cosmic.ucar.edu/.

Home page, GeoEye, Sep. 2008, http://www.geoeye.com/CorpSite/.

Home page, RapidEye Media, 2007, Archived Oct. 2008, http://www.rapideye.com/.

Home page, Spacex, Jul. 2008, http://www.spacex.com/.

ICESat Home Page, NASA, Sep. 2008, http://icesat.gsfc.nasa.gov/.

Kirchengast et al., Accurate—Observing Greenhouse Gases, Isotopes, Wind, and Thermodynamic Variables by Combined MW Radio and IR Laser Occultation, presentation at OPAC-3, Sep. 2007, http://wegc203116.uni-graz.at/OPAC3/m_scientific_programme.php?day=4.

Kursinski et al., Observing Earth's atmosphere with radio occultation measurements, Journal of Geophysical Research, Oct. 1997, vol. 102(D19): 23429-23465.

Kursinski et al., A microwave occultation observing system optimized to characterize atmospheric water, temperature and geopotential via absorption, Journal of Atmospheric and Oceanic Technology, Dec. 2002, http://www.atmo.arizona.edu/~kursinsk/NextGenOccEarth.htm.

Kursinski et al., Active Temperature, Ozone and Moisture Microwave Spectrometer (ATOMMS), Response to NRC Decadal Survey RFI, May 2005, http://www.atmo.arizona.edu/~kursinsk/NextGenOccEarth.htm.

Luntama, Radio Occultation Soundings in Ionosphere and Space Weather Applications: Achievements and Prospects, Presented at OPAC-3, Sep. 2007, http://wegc203116.uni-graz.at/OPAC3/m_scientific_programme.php?day=1.

Missions-SeaWinds on QuikSCAT, NASA, May 2008, http://winds.jpl.nasa.gov/missions/quikscat/index.cfm.

National Research Council, Earth Science and Applications from Space: National Imperatives for the Next Decade and Beyond, The National Academies Press, ISBN-10: 0-309-10387-8, Jan. 2007, 456 pp., www.nap.edu/catalog.php?record_id=11820.

Observing the Earth, ESA, Sep. 2008, www.esa.int/esaEO/SEM9JP2VQUD_index-0_m.html.

Report emphasises science benefits of ESA's Earth Observation Envelope Programme, ESA Observing the Earth, Oct. 2005, www.esa.int/esaEO/SEMX8Y3J2FE_index-0.html.

Terra SAR-X: First Commercial lm Radar Satellite, Infoterra, Jul. 2008, http://www.infoterra.de/terrasar-x.html.

The future-Galileo, ESA, Jul. 21, 2015, Archived Sep. 2008, http://www.esa.int/esaNA/galileo.html.

Understanding Space Weather, GeoOptics, Sep. 2008, 25 pages, http://geooptics.com/.

Yunck et al, A history of GPS sounding, in Lee, L., C. Rocken and E. Kursinski, eds., Jan. 2000, Applications of Constellation Observing System for Meteorology, Ionosphere & Climate, Springer-Verlag, ISBN 962-430-135-2, pp. 1-20.

(56) References Cited

OTHER PUBLICATIONS

Yunck, Orbit Determination, in Global Positioning System—Theory and Applications, B. Parkinson and P. Axelrad, eds., AIAA book, 1995.

T. Yunck and C. McCormick, The CICERO Project Community Initiative for Continuing Earth Radio Occultation, COSMIC Workshop, Boulder, CO, Oct. 24, 2007.

T. Yunck, The Road to Operational RO Entering the Mainstream, COSMIC Data Users Workshop, UCAR, Boulder, CO, Oct. 27, 2009.

\* cited by examiner

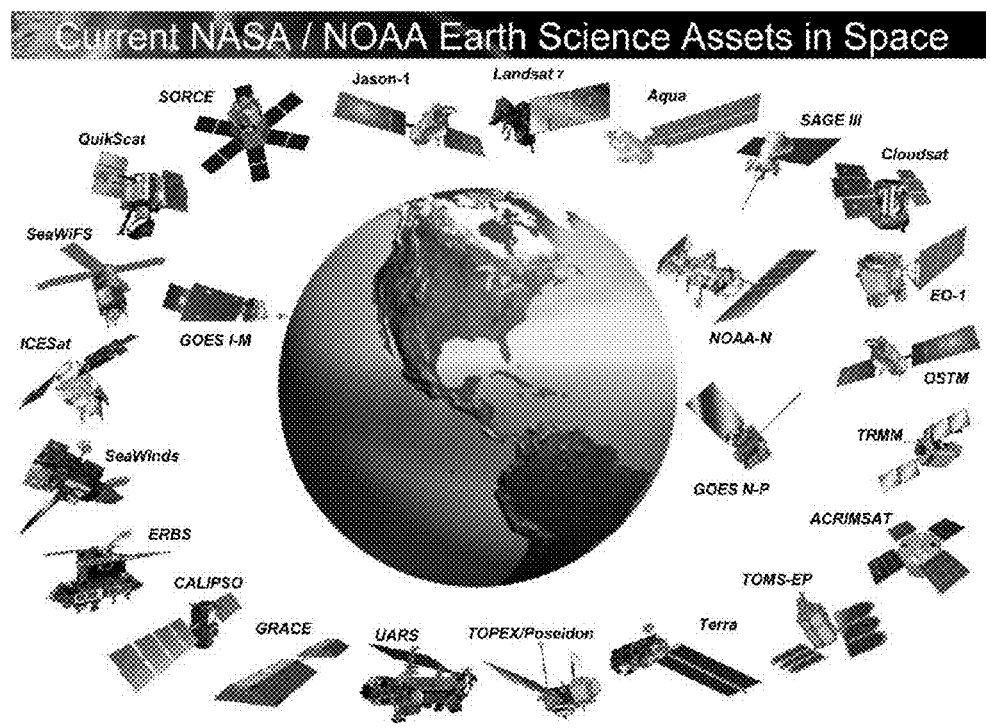
Fig. 1. Most of the current NASA (outer ring) and NOAA Earth observing spacecraft. Multiple copies of each NOAA satellite are operating in Earth orbit.
PRIOR ART

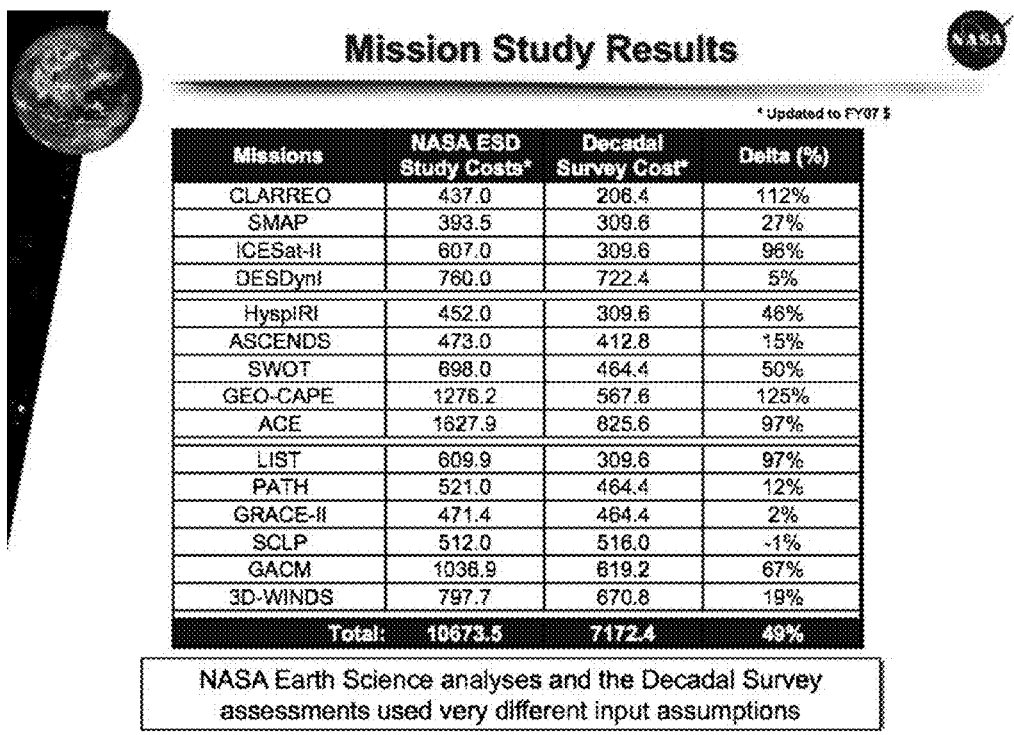
Fig. 2. *Proposed NASA Earth missions for the next 10-15 years.*
PRIOR ART

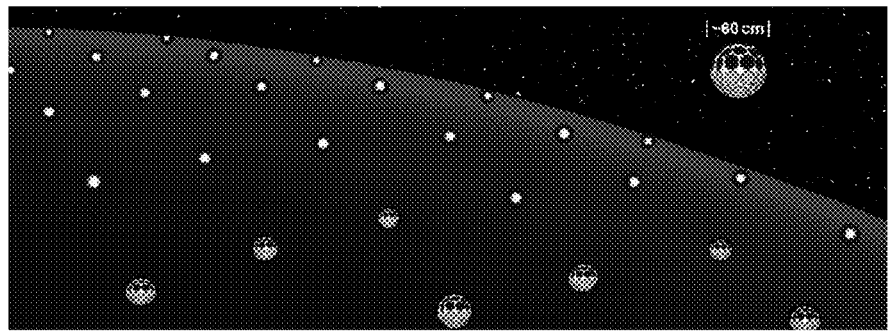
Fig. 3. *Illustration of the cellular paradigm of Earth observation from low orbit. A typical cell will be a meter or less in diameter.*
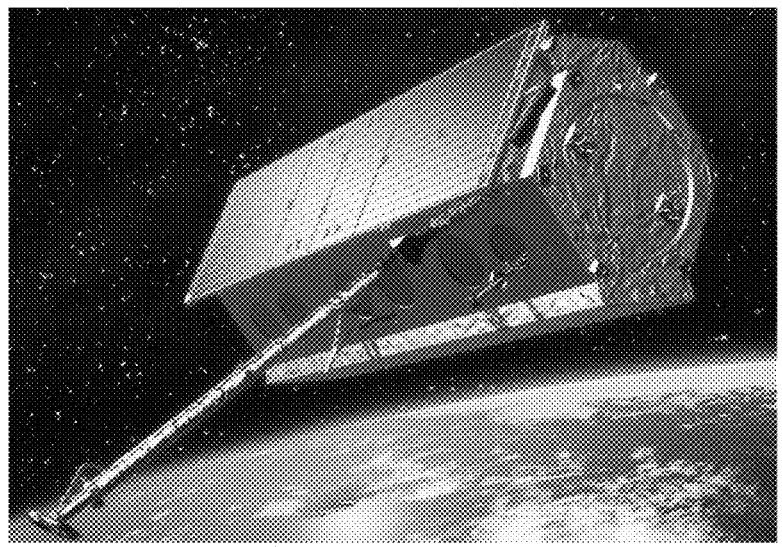
Fig. 4. *Germany's TerraSAR-X radar imaging satellite is 5 meters long and weighs 1230 kg.*
PRIOR ART
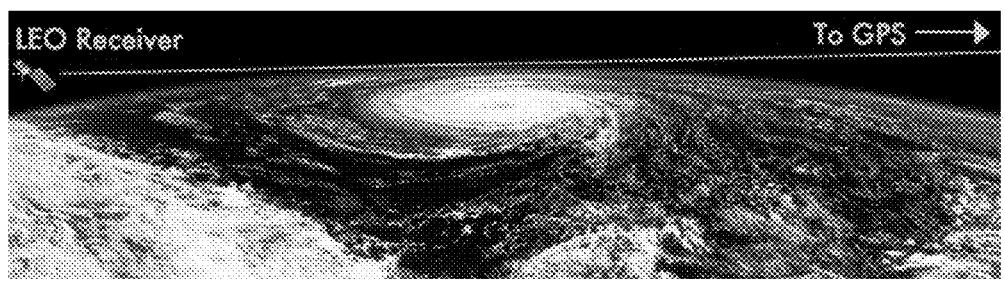
Fig. 5. *Illustration of a LEO receiver observing a GPS signal passing through the atmosphere.*
PRIOR ART

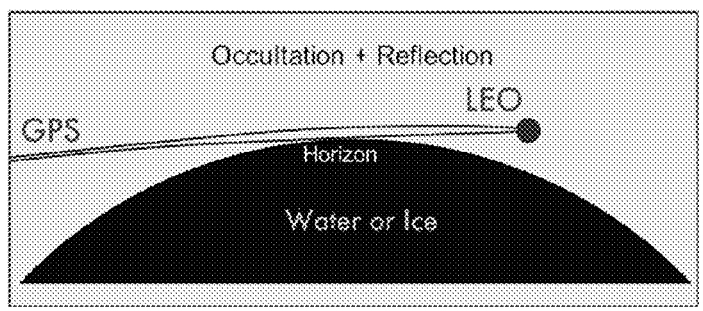
Fig. 6. *Limb-viewing antennas can acquire occultations and glancing reflections at once.*
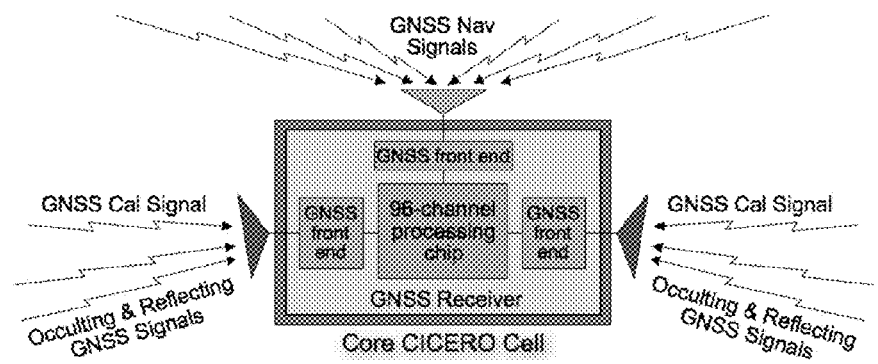
Fig. 7. *The core CICERO cell observes GNSS signals above for navigation and at the limb for atmospheric occultations and surface reflections.*
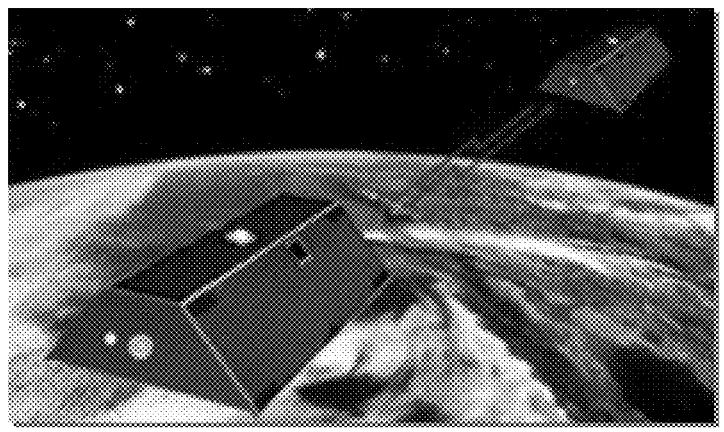
Fig. 8. *Artist's rendering of NASA's GRACE gravity mission.*
PRIOR ART

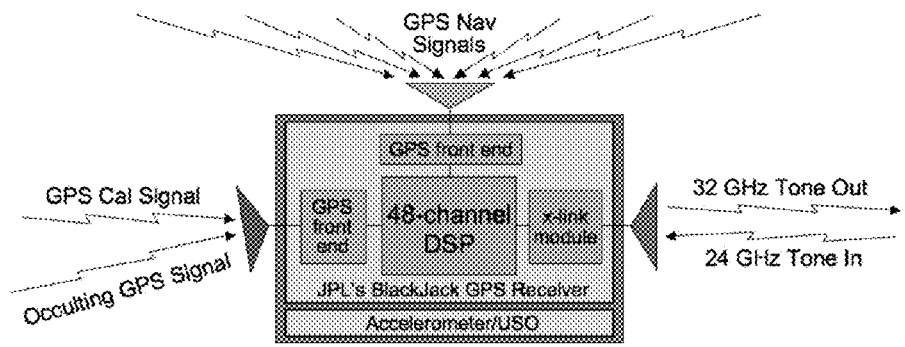
Fig. 9. *High-level functional block diagram of one GRACE spacecraft.*
PRIOR ART
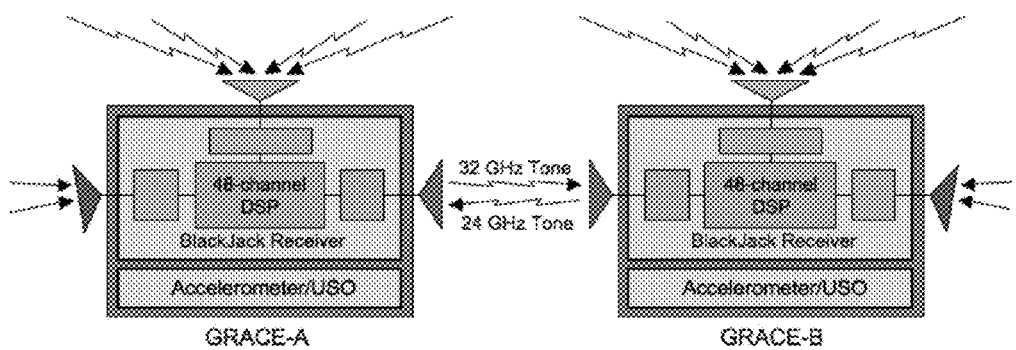
Fig. 10. *Illustration of the two GRACE spacecraft operating together.*
PRIOR ART
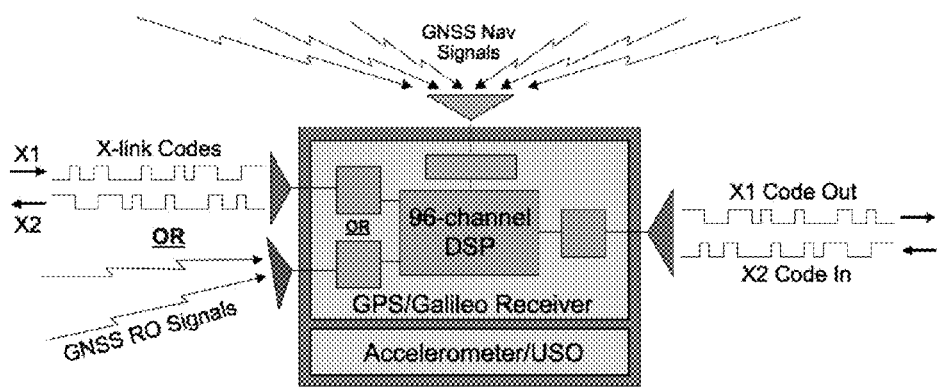
Fig. 11. *Illustrating several of the proposed innovations required for EGO cells.*

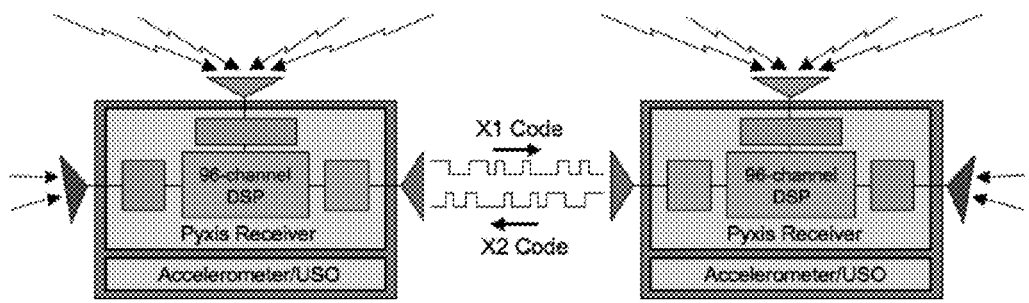
*Fig. 12. EGO arranged in a minimal GRACE-like twin-cell configuration.*
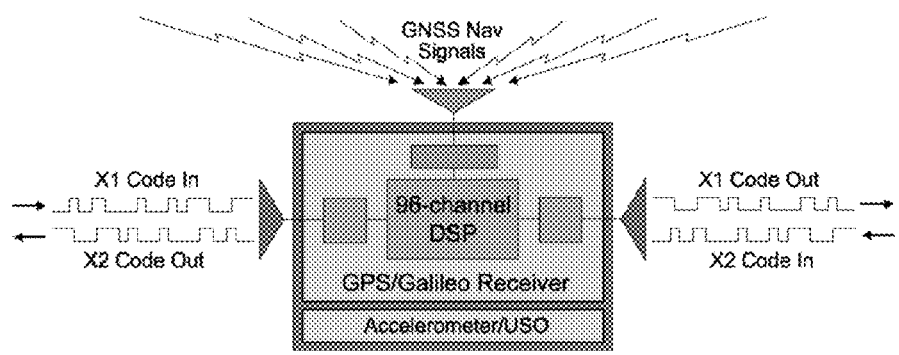
*Fig. 13. Functional layout of interior cells for EGO's general N-cell configuration.*
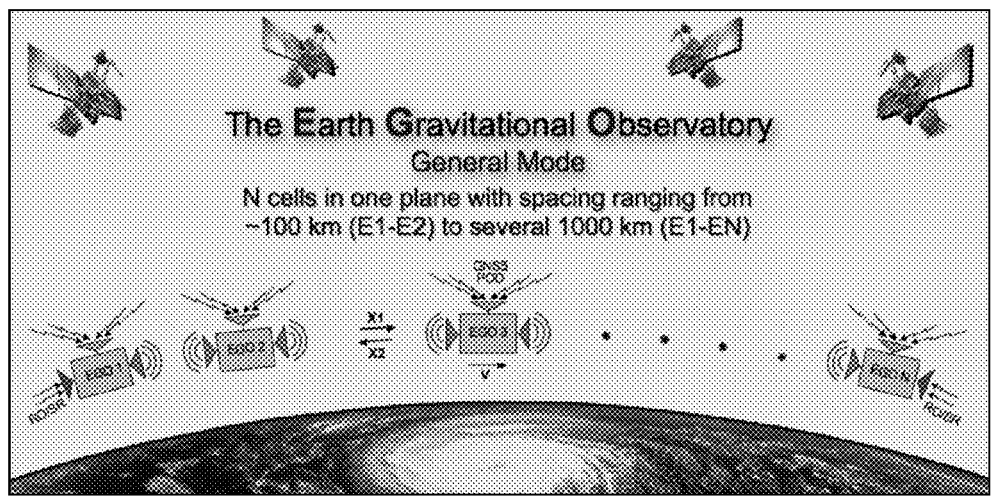
*Fig. 14. Illustrating EGO deployed in its general N-cell mode.*

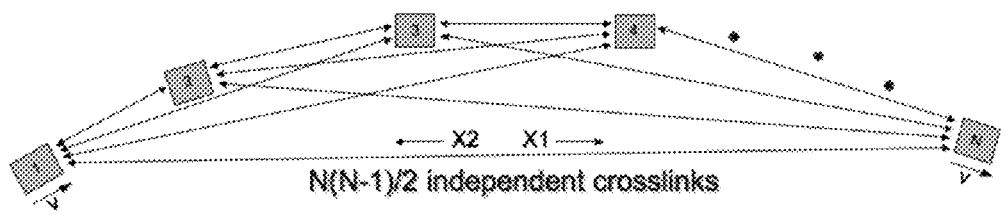
*Fig. 15. Illustration of the ten observable crosslinks with a five-cell EGO chain.*
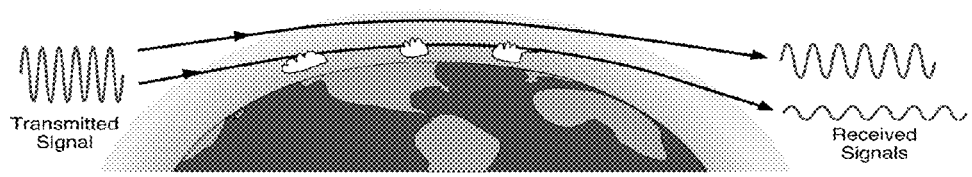
*Fig. 16. Unlike GNSS sounding, which relies only on signal bending, XO observes amplitude changes caused by signal absorption to sense moisture and ozone concentrations.*
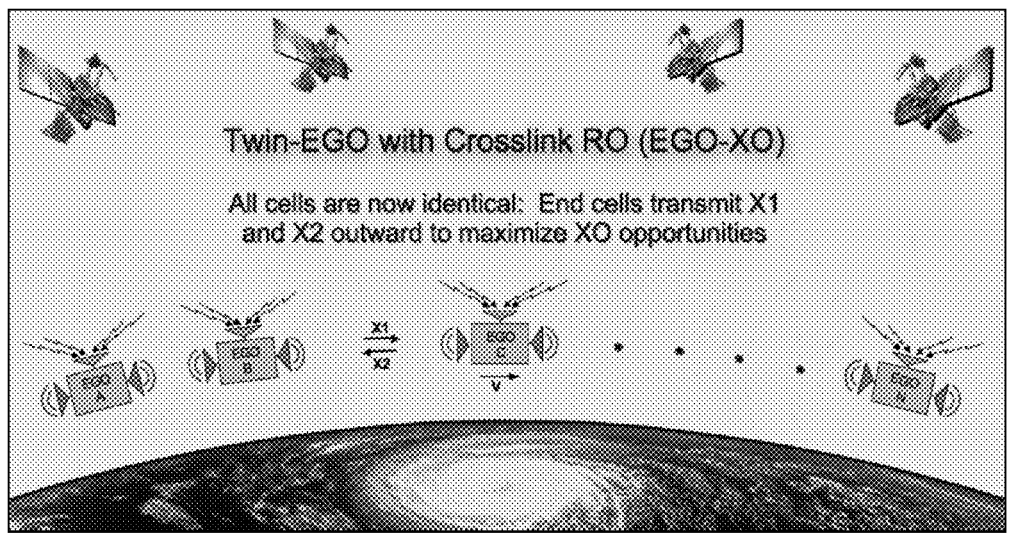
*Fig. 17. For EGO-XO, end and interior cells are identical, transmitting crosslinks fore and aft.*

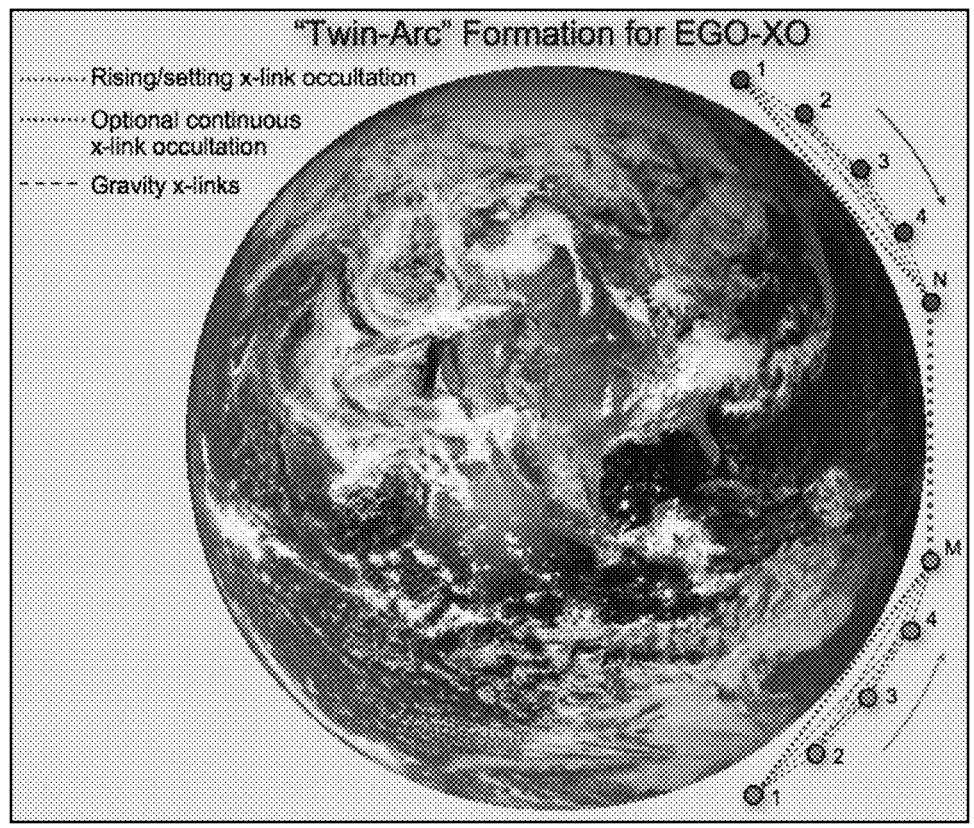
*Fig. 18.* Illustrating the baseline "twin-arc" formation for EGO-XO.
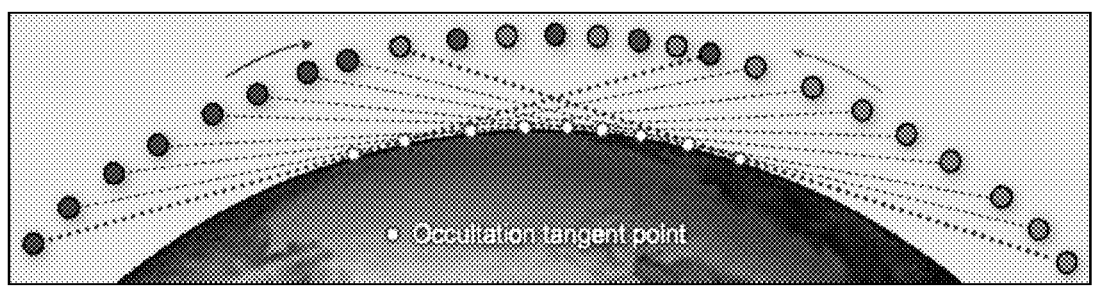
*Fig. 19.* Snapshot of the twin-arc EGO chains as they pass by one another.

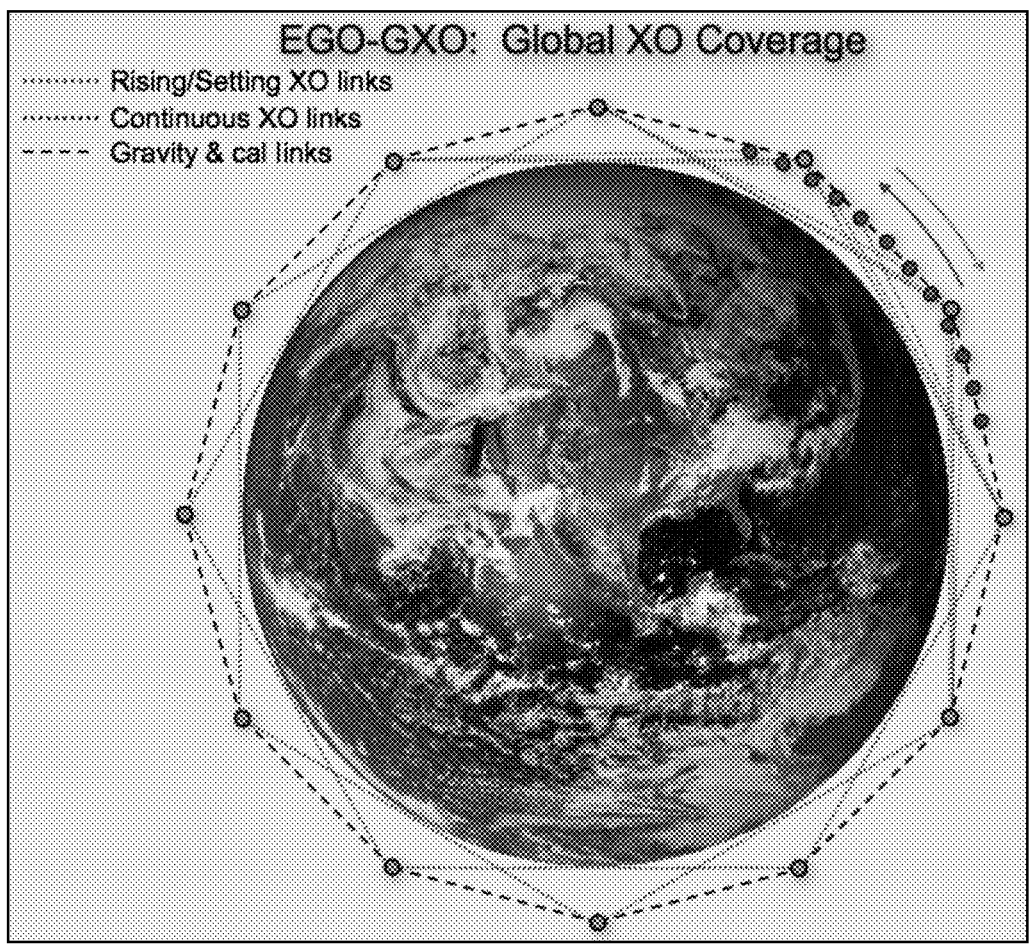
*Fig. 20.* The "arc-and-ring" orbit configuration for EGO-GXO.

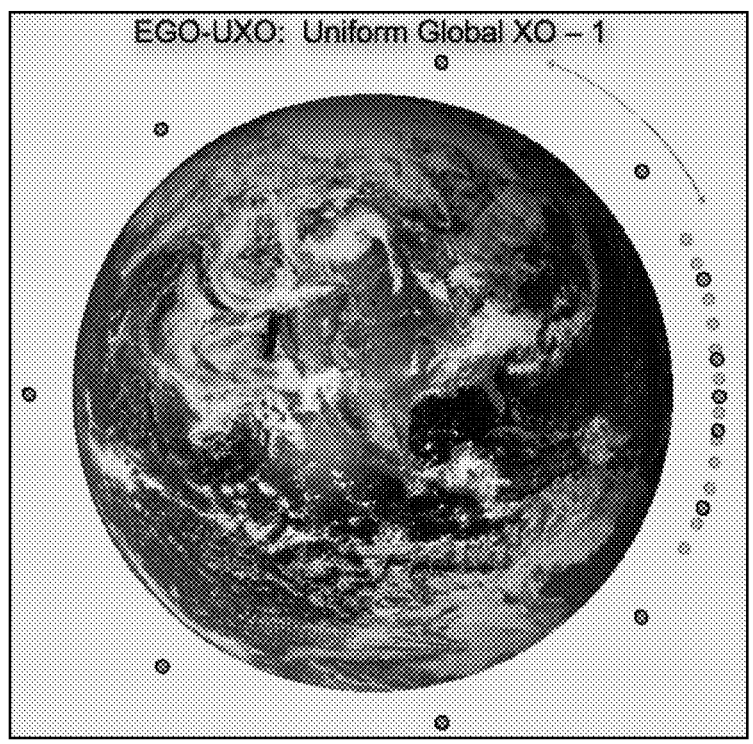
*Fig. 21.* EGO-UXO: Uneven spacing of the ring cells can yield nearly uniform global sampling. Here the highest-density XO sampling occurs when the (red) arc cells pass over the tropics.
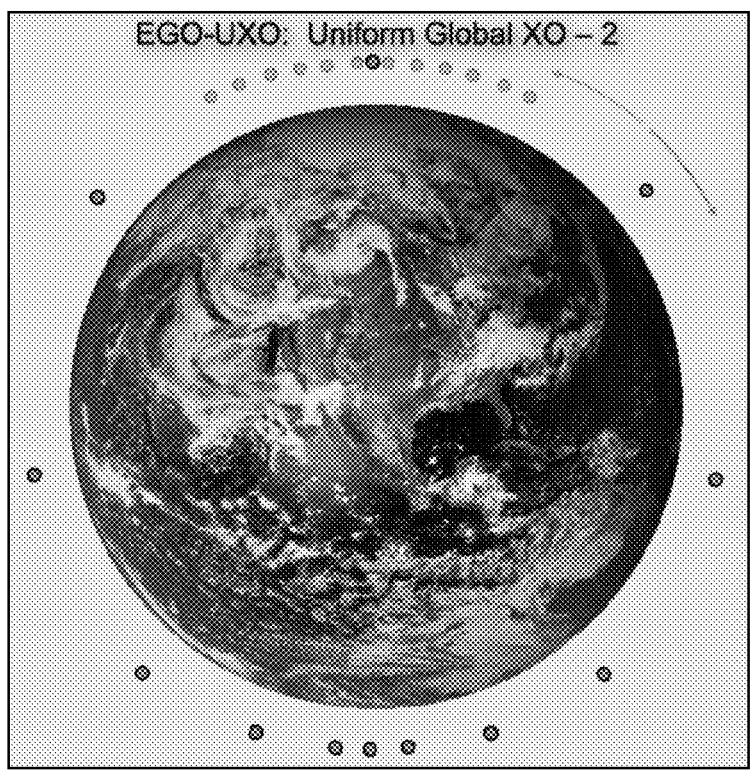
*Fig. 22.* Lowest-density UXO sampling occurs when the arc cells pass over the poles.

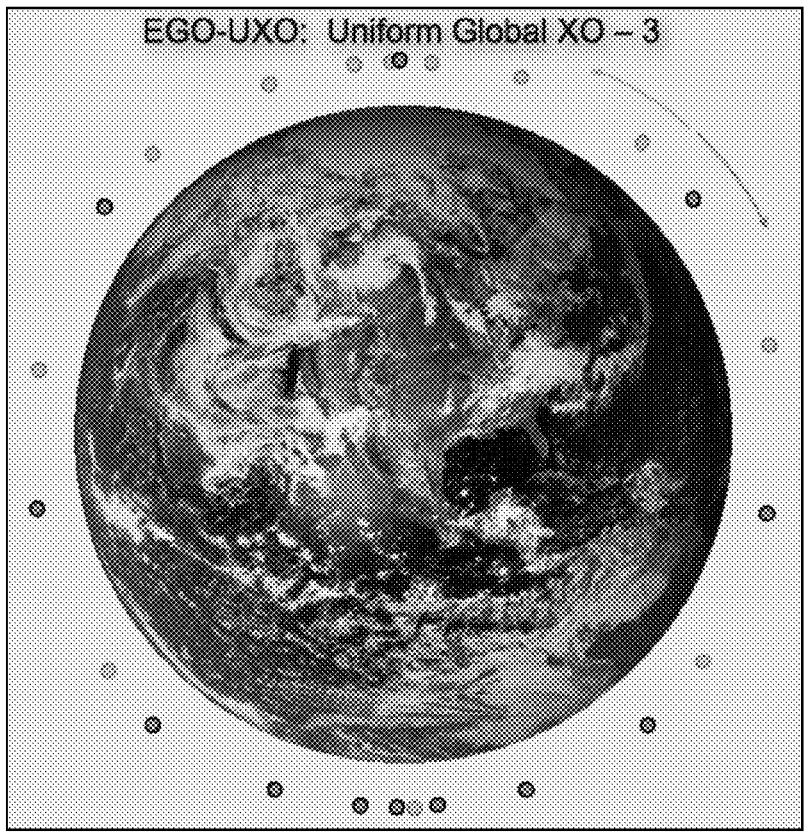
*Fig. 23.* A variant of EGO-UXO uses two unevenly spaced counter-rotating rings. This samples more parts of the earth at once but alters the mix of EGO links for gravity recovery.
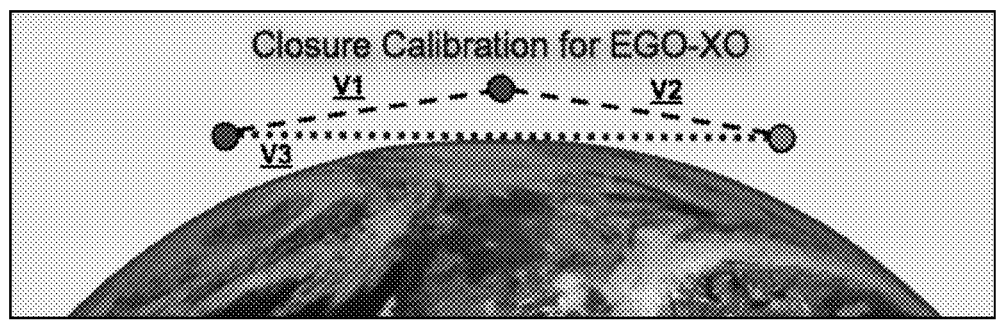
*Fig. 24.* Illustrating three-cell closure for EGO-XO velocity calibration.

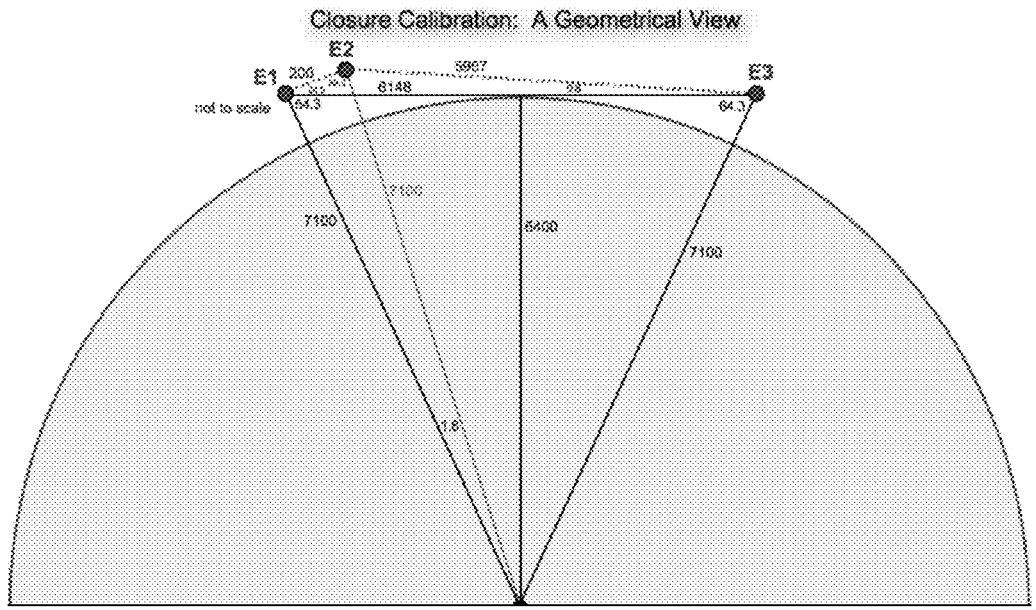
*Fig. 25.* Typical geometry for an EGO-XO atmospheric occultation for cells at 720 km altitude.
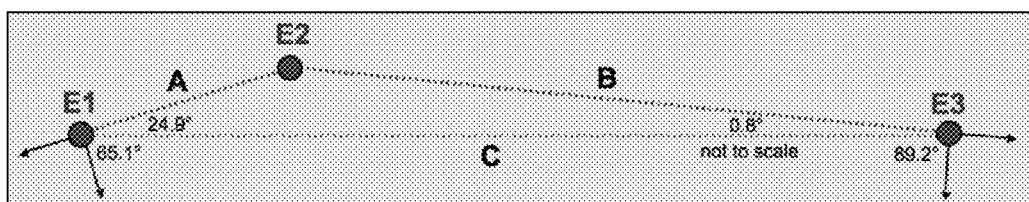
*Fig. 26.* Detail of the occultation and three-way closure geometry of Fig. 20.
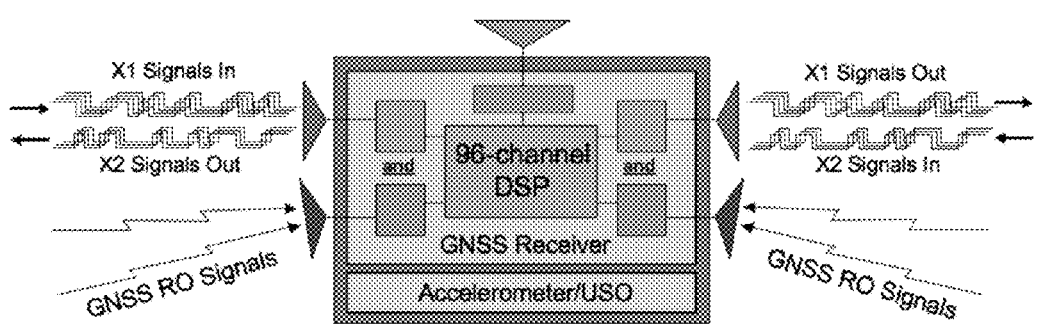
*Fig. 27.* Illustrating some possible enhancements to EGO-XO cell features.

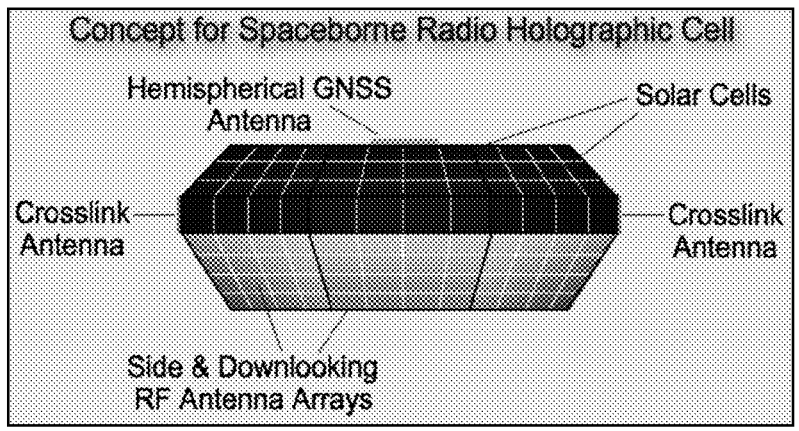
*Fig. 28.* Generic concept for a LEO cell to perform global radio holography.
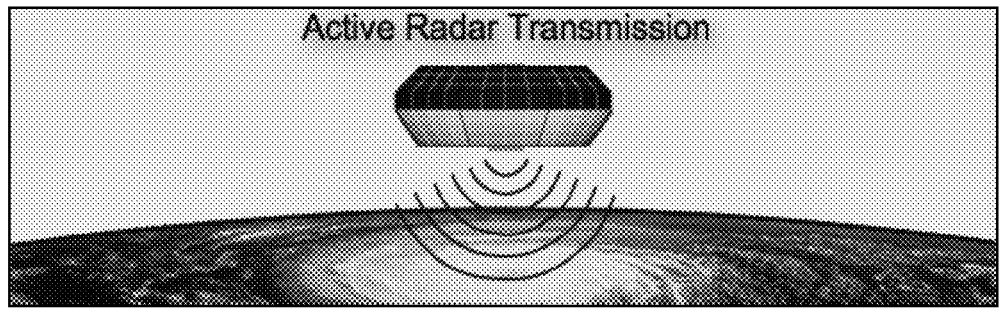
*Fig. 29.* To realize the full potential of cellular RH we must include active radar transmissions.
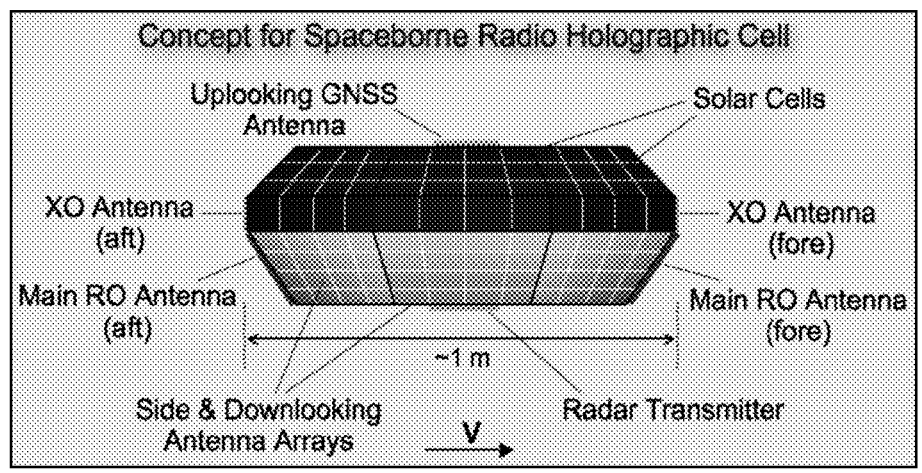
*Fig. 30.* Further details of the proposed CICERO cell.

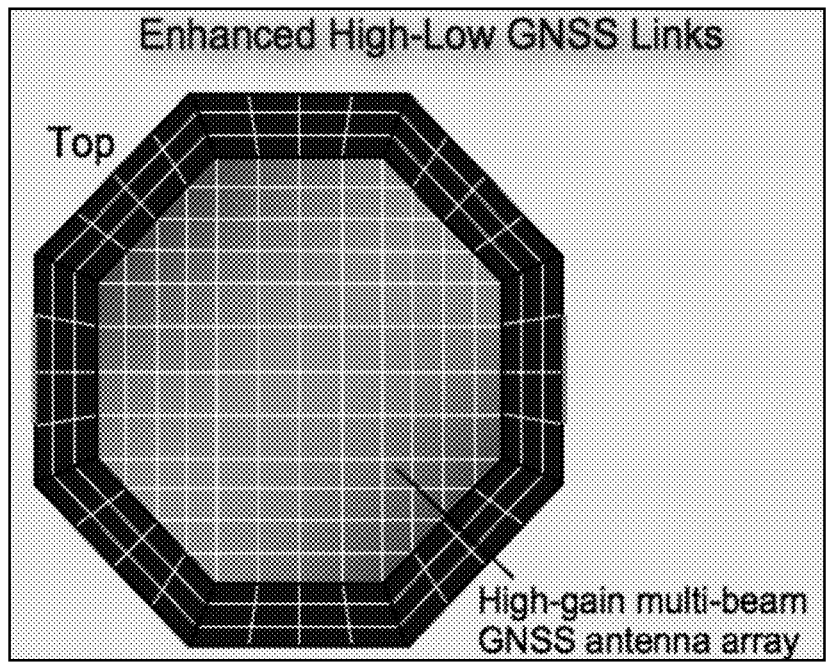
*Fig. 31.* Converting the top surface to a high-gain, multi-beam GNSS antenna greatly improves GNSS phase measurement precision and enhances EGO gravity recovery.
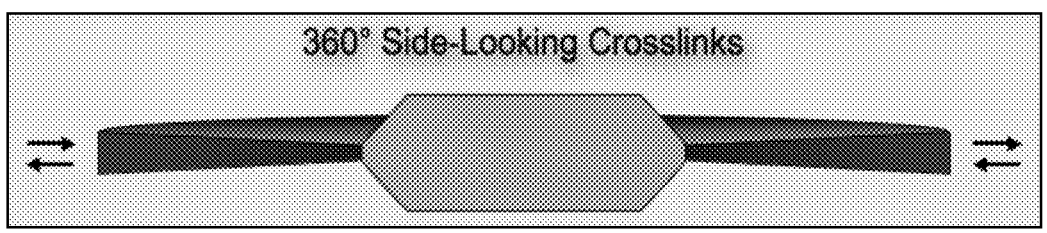
*Fig. 32.* Side-looking crosslinks in all directions open up many new application possibilities.

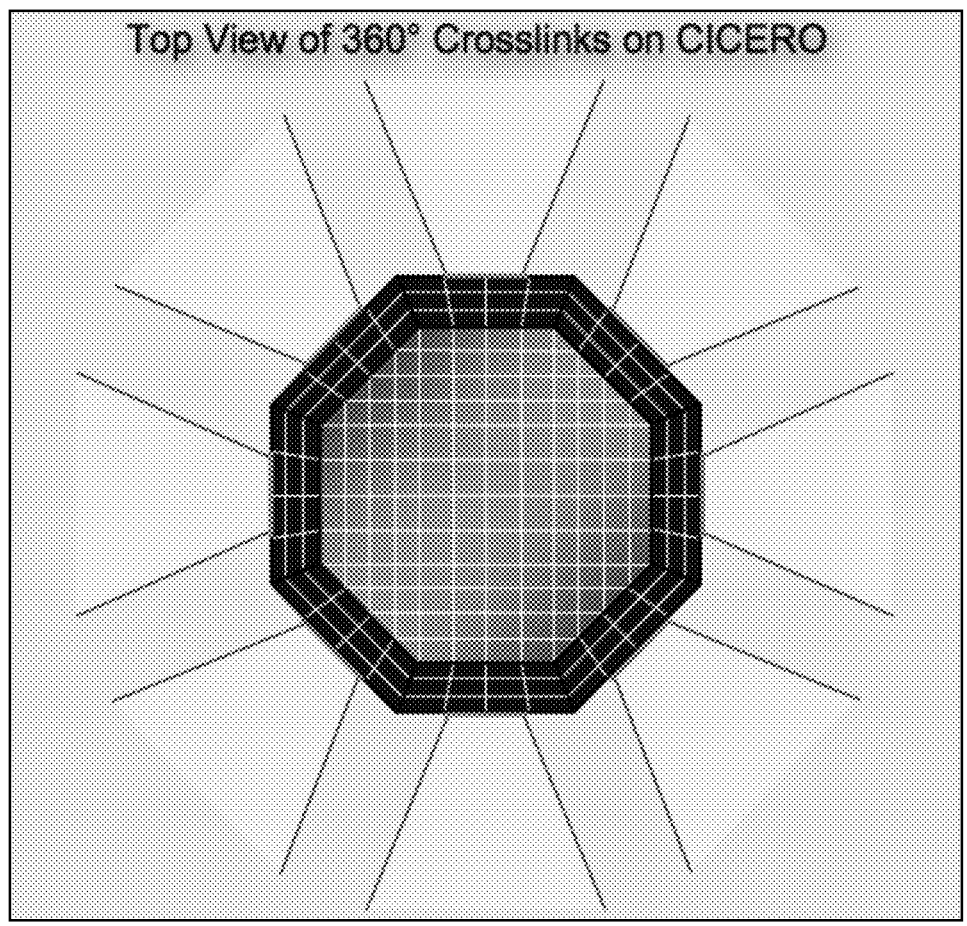
*Fig. 33.* We can achieve full-circle crosslinks with antennas on all sides of the cell.

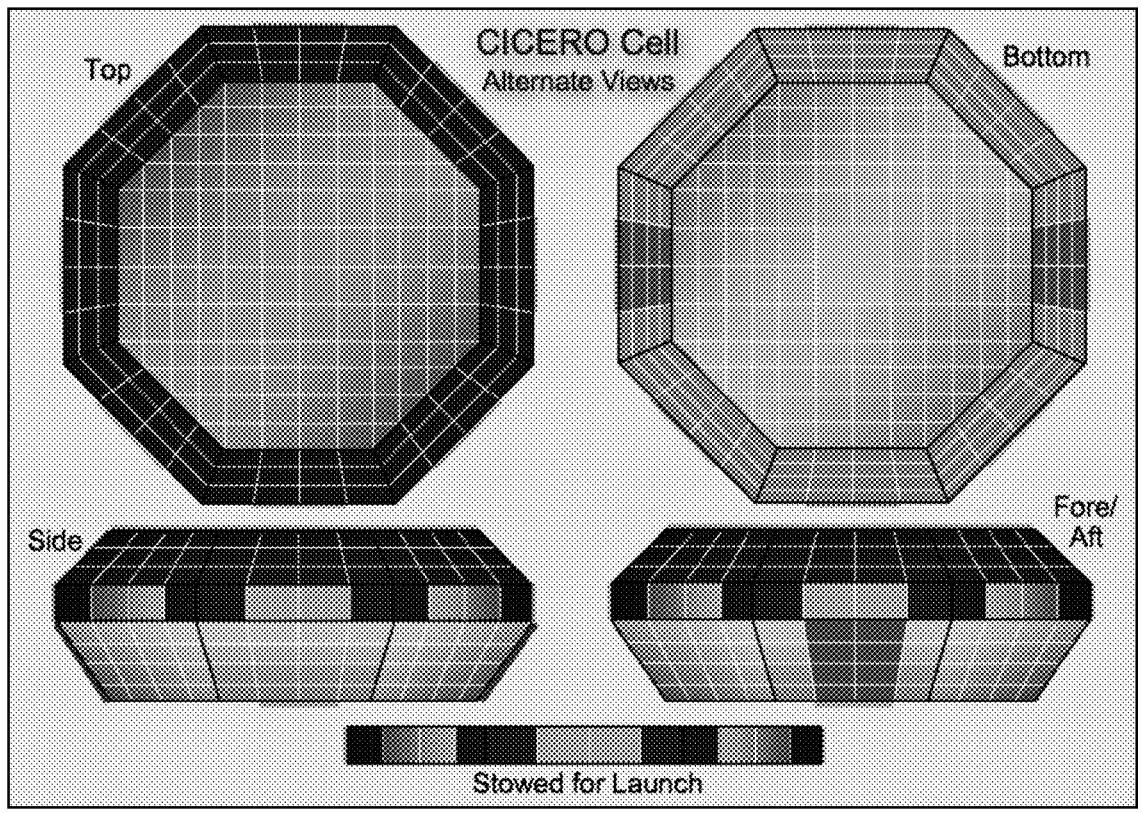
*Fig. 34.* Various views of the CICERO conceptual cell design.
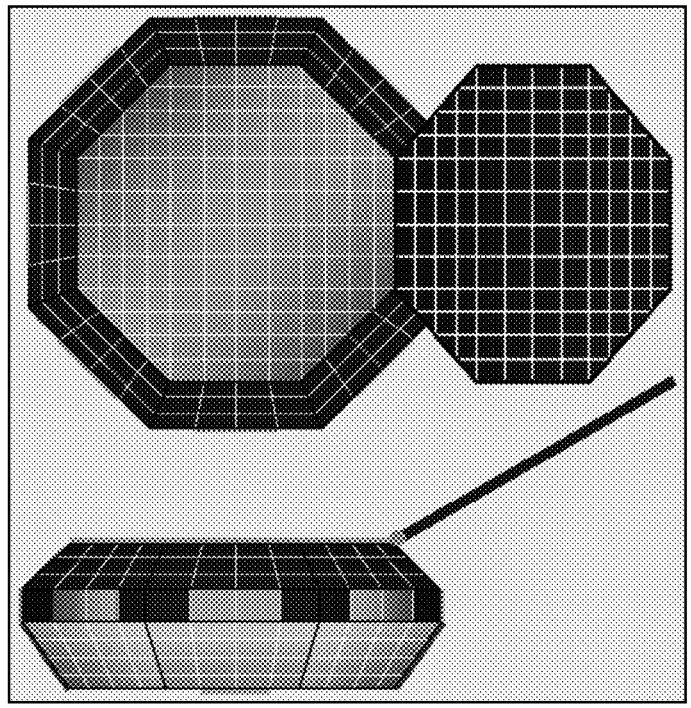
*Fig. 35.* Alternative cell configuration with an additional foldout solar panel.

CELLULAR INTERFEROMETER FOR CONTINUOUS EARTH REMOTE OBSERVATION (CICERO)

TECHNICAL FIELD AND APPLICABILITY OF THE INVENTION

This invention relates to the observation and measurement of the Earth and its local space environment, including the interlinking components of the Earth system and near-Earth environment and the processes by which they interact, by means of sensors in low Earth orbit (LEO). In particular it relates to the use of distributed arrays of many small, free-flying LEO sensors to accomplish what currently is done with one or a few larger observing platforms at altitudes from LEO to geostationary orbit.

BACKGROUND OF THE INVENTION

Spaceborne systems for making scientific observations of the earth tend to be large and specialized for a particular type of measurement, such as ocean altimetry or atmospheric chemistry. Platforms that attempt to provide diverse types of observations simply carry a variety of costly, specialized instruments and can be as large as a city bus. The average cost of a focused Earth science mission at NASA is approaching $1B. The cost of the larger, multi-purpose observing platforms, like NASA's EOS spacecraft (Terra, Aqua, and Aura) and NOAA's NPOESS and GOES-R, has surpassed $3B. These costs have discouraged the use of large constellations in low orbit that can observe virtually the entire earth at close hand all at once. That situation is about to change. The same micro-electronic and wireless technologies that give us vest-pocket super-phones for $300 can be brought to bear on spaceborne observing systems and reduce their size and cost by up to two orders of magnitude. This opens the door to an entirely new kind of Earth observing system comprising many tiny, free-flying "cells" that are individually simple but that together can perform the sensing functions of a dozen or more of today's bulky, highly specialized observing platforms, and at far lower cost.

The nature of the prior art is evident from (a) the Earth observing missions now flying; (b) the list of Earth missions planned or proposed by NASA and NOAA over the next 15 years; (c) patents for new remote sensing mission and measurement concepts; and (d) mission and measurement concepts described in the open literature.

(a) Current Earth Observing Missions

FIG. 1 shows an essentially complete collection of current Earth observing missions operated by NASA and NOAA. NASA missions constitute the outside ring and NOAA missions the inner satellites. Counting duplicate NOAA spacecraft not shown, there are about 30 currently operating missions carrying more than 120 individual instruments. These missions constitute two classes: (1) the "super-platforms" carrying a variety of different instruments (Terra, Aqua, Aura, GOES, NOAA-N), which are now in the $3B cost class, and (2) what we will call "focused" missions—lower-cost missions designed to address a narrower set of scientific questions. The latter generally cost in the 300-800 M$ range in today's dollars. Whereas the super-platforms may be the size of a city bus, the focused mission spacecraft tend to be about the size of a car or minivan.

Each of these missions was designed to perform specific functions. GRACE is a twin-satellite system to measure the earth's gravitational field; IceSAT performs laser altimetry over ice and water; Jason-1 and OSTM perform radar altimetry over the oceans; CloudSat and CALIPSO measure cloud properties; TRMM observes tropical rainfall; Quickscat performs ocean scatterometry; Landsat focuses on land surface properties, and so on. Even the super-platforms have a targeted, if somewhat broader focus: Terra on land observation, Aqua on water, Aura on atmosphere, POES (NOAA-N) on weather. To the extent that there is an Earth-observing constellation it is simply an ad hoc collection of large, costly platforms, each tailored for unique scientific and observational objectives.

Emerging Constellations:

In some commercial and governmental quarters the idea of rudimentary remote sensing constellations is taking hold, primarily for Earth imaging. (There are also large commercial constellations for global telecommunications, which is outside our domain of interest.) Germany is putting up their TerraSAR-X and Tandem-X radar imaging system [1]; Italy is planning a five-satellite COSMO-SkyMed radar imaging system [2]; DigitalGlobe, GeoEye, and RapidEye are planning few-satellite optical imaging systems [3]-[5]. These, however, are simply multiple copies, in small numbers, of larger, dedicated platforms designed for a single purpose. All are devoted to Earth imaging in one form or another. A slight departure from this is the COSMIC system of six GPS radio occultation satellites funded primarily by Taiwan [6]. While these too are focused on a single purpose, the individual satellites are smaller and lower cost than the others thus far mentioned. CICERO will carry this miniaturization much further and introduce incomparably greater functional versatility.

(b) Proposed Earth Observing Missions

FIG. 2 lists the 15 top-priority new missions proposed for NASA for the next 10-15 years. This list is the result of a major "Decadal Survey" conducted by the National Research Council for NASA and NOAA and released in January 2007 [7]. Also shown are the nominal mission costs in 2007 dollars as estimated during the Decadal Survey and independently by NASA. Apparent from this list (and from the detailed reports and mission design studies) is that there is no hint of movement away from the current paradigm of large, costly, single-purpose, single-platform missions, each individually designed for narrow observational objectives. Indeed, this list moves even further down that road. Each proposed mission requires a substantial base platform. The average mission cost as estimated by NASA (which provides the best-informed estimates) is $711M in 2007 dollars, or nearly $1B each at the time the missions are proposed to fly. A similar, somewhat shorter list from the European Space Agency (ESA) shows exactly the same pattern [8],[9]. There is no thought yet by the major agencies of breaking from this model of costly, focused observing platforms, though there is some hint that there will be fewer of the super-platforms in the future.

The Decadal Survey also proposed two new operational NOAA missions not shown in FIG. 2: A mission to measure total solar irradiance and a COSMIC follow-on mission to perform Global Navigation Satellite System radio occultation (GNSS RO). The COSMIC follow-on, however, is presented strictly as an update to COSMIC: a constellation of 6-12 satellites focused exclusively on radio occultation of the atmosphere. There is no hint of larger numbers or greater functional versatility.

(c) Patents for Mission and Measurement Concepts

A patent search for similar or related ideas turned up nothing resembling our cellular, multi-function CICERO concept. All ideas for Earth observing systems or measurements tend to focus on a particular type of measurement for a particular observational purpose, very much in the paradigm of the current and proposed mission lists. The search did, however, turn up various ideas relevant to CICERO in one way or another. We list here the most pertinent of these with some brief comments.

U.S. Pat. No. 4,727,373—Method and system for orbiting stereo imaging radar, Feb. 23, 1988: This describes a tethered system for stereo (and presumably interferometric, though that is not mentioned) SAR imaging. CICERO will be able to accomplish the same thing with non-tethered, free-flying cells through use of centimeter-level, GNSS-based precise orbit determination to precisely co-register independently acquired images.

U.S. Pat. No. 4,990,925—Interferometric radiometer, Feb. 5, 1991: This describes a particular technique involving an interferometer on a single platform to map the 2D radio or microwave intensity pattern of a given scene with high resolution. Again, CICERO will be able to perform a similar operation by precisely co-registering radio or microwave data acquired independently by two or more cells.

U.S. Pat. No. 5,546,087—Altimetry method, Aug. 13, 1996: This patent by a French group proposes the now well-known method of bistatic radar altimetry with radio signals of opportunity, particularly those from global navigation satellites. While this was submitted in October 1994, there are documented proposals for precisely the same technique by US groups at least as early as 1991, though they did not seek patents. CICERO will be able to perform this method of altimetry as one of its many possible observational functions.

U.S. Pat. No. 5,552,787—Measurement of topography using polarimetric synthetic aperture radar, Sep. 3, 1996: This proposes a "polarimetric" SAR technique for measuring "terrain azimuthal slopes and a derived estimate of terrain elevation." CICERO will be able to provide similar information with more conventional SAR and interferometric SAR (InSAR) techniques. Since CICERO also preserves precise signal polarization information, it could in principle allow use of this technique as well, though just how well remains to be investigated.

U.S. Pat. No. 5,608,404—Imaging synthetic aperture radar, Mar. 4, 1997: This proposes a particular technique for efficiently forming a SAR image by first collecting the returned signals in a set of subaperture antenna elements, initially processing each subaperture array separately to obtain coarse-resolution in azimuth, then merging subaperture results to obtain full aperture resolution. This is essentially an efficient SAR processing technique for the acquired data. CICERO will collect radar data with an array of many sub-elements and thus this technique could in principle be applied in the processing, although other techniques are available as well. Methods of processing SAR data are outside the scope of interest of the present invention.

U.S. Pat. No. 5,931,417—Non-geostationary orbit satellite constellation for continuous coverage of northern latitudes, Aug. 3, 1999: This proposes a particular arrangement of elliptical orbits for Earth observing spacecraft that would provide continuous coverage of northern latitudes from below geostationary altitude. CICERO instead will use larger numbers of cells in low circular orbits. With enough cells, CICERO will provide continuous coverage of the entire globe from a very low altitude.

U.S. Pat. No. 5,936,588—Reconfigurable multiple beam satellite phased array antenna, Aug. 10, 1999: This proposes a method of controlling a phased array antenna to form two or more simultaneous beams and steering them in real time to desired target points. The method has the disadvantage that different antenna elements are used to form the different beams and thus the gain of each simultaneous beam is less than the gain of the full antenna array. (The sum of the beam gains equals the total antenna gain.) CICERO will not steer the beam of its phased array antenna to particular points in real time. Rather, it will preserve the signal information arriving at each array element so that the full gain of the array can be steered arbitrarily to any number of points simultaneously long after the data have been acquired.

U.S. Pat. No. 6,011,505—Terrain elevation measurement by interferometric synthetic aperture radar, Jan. 4, 2000: This proposes a method of processing radar data to form corrected SAR images and of combining image pairs to form a SAR interferogram yielding accurate terrain elevation information. It is a processing technique. It is not clear to us how this technique differs from previously demonstrated InSAR techniques that yield similar information. In any case, the technique (and others) could be readily applied to CICERO data to form SAR images and interferograms. The essence of CICERO is that it provides raw data that can be combined and processed in myriad ways for many purposes besides SAR and InSAR; this technique can surely be used as well.

U.S. Pat. No. 6,130,644—Method and apparatus for geodetic surveying and/or earth imaging by satellite signal processing, Oct. 10, 2000: This proposes a method of forming SAR interferograms using reflected signals observed both by the satellite(s) and by at least one directional antenna fixed relative to the ground. While there are other satisfactory ways of forming the interferograms, this can offer an enhancement and is perfectly suitable for use with CICERO data for anyone wishing to install such ground antennas, which are not inherent in the CICERO system.

U.S. Pat. No. 6,264,143—Radar interferometry device, Jul. 24, 2001: This proposes a configuration of satellites for obtaining InSAR measurements of the earth's surface. The configuration involves at least one emitter satellite and a constellation of receiver satellites. So far, this is similar to the radar function (and only the radar function) of CICERO. However, the receivers are specified to be " . . . accurately synchronous and their orbits [to] have the same eccentricity which is different from that of the orbit of the emitter. During one orbital period, the satellites travel round a relative ellipse over which they are uniformly distributed. The invention [applies] specifically to measuring ocean currents, measuring world topography, and differential interferometry." This is a very particular configuration for a particular type of InSAR measurement. CICERO does not reproduce or mimic this configuration. CICERO will, however, be able to provide equivalent observational information, again by exploiting centimeter-accuracy GNSS-based POD for all cells to precisely co-register data from multiple cells.

U.S. Pat. No. 6,388,606—Aircraft or spacecraft based synthetic aperture radar, May 14, 2002: This proposes a type of bistatic SAR system (i.e., a system wherein the emitting and receiving elements are separate) in which both the emitter and receiver can be moving, as they are with CICERO. The uniqueness of this invention lies in its use of different beamwidths for the transmit (wide beam) and receive (narrow beam) antennas, and other methods to suppress antenna sidelobes and facilitate ambiguity removal in determining the point of reflection. This technique can indeed be mimicked with CICERO by proper combination of the data from the multiple distinct antenna elements on each cell. The uniqueness of CICERO lies not in any novel method of SAR imaging, but in its novel architecture that allows many types of radar sensing (not just imaging) as well as many other forms of non-radar Earth, atmospheric, and ionospheric sensing.

U.S. Pat. No. 6,400,306—Multi-channel moving target radar detection and imaging apparatus and method, Jun. 4, 2002: This proposes a type of radar imaging involving an illuminator and multiple receiving apertures on aircraft or in space. The uniqueness of the invention lies in its use of "space-time adaptive processing (STAP) algorithms to better compensate for channel mismatches, better suppress stationary clutter, and to suppress main beam jamming," leading to a claimed improvement in moving target detection. Again, this sort of tailored radar processing is outside of the area of claims of the present invention. We note, however, that because CICERO will preserve the essential information in the signals received at each antenna element, it will permit such tailored techniques to be applied in processing and thus their benefits to be realized.

U.S. Pat. No. 6,452,532—Apparatus and method for microwave interferometry radiating incrementally accumulating holography, Sep. 17, 2002: This proposes a particular arrangement of orbits for space-based bistatic SAR imaging, wherein the receiving satellites cannot generally observe the same target spot at the same time. (This necessarily closes off the possibility of imaging moving targets.) In this proposed configuration, satellites are placed in three precisely prescribed, mutually orthogonal orbit planes, the criticality of which is insisted upon by the inventor (though, to this reader, the reasoning is obscure). CICERO has no such constraint and does not employ such orbits. CICERO can image moving targets at high resolution with multiple receivers viewing the same target at once, can image stationary targets with data acquired at different times, and can perform all other functions claimed for this invention without its rather substantial limitations.

U.S. Pat. No. 6,586,741—Method and system for two-dimensional interferometric radiometry, Jul. 1, 2003: This proposes an interferometric technique for imaging a planetary surface with received thermal (i.e., infrared) radiation. As the baseline CICERO system will not include thermal radiation sensors, this invention is only minimally relevant.

U.S. Pat. No. 6,844,844—System comprising a satellite with radiofrequency antenna, Jan. 18, 2005: This proposes a design for a space-based phased-array radar antenna. The unique aspect of this invention is a means of controlling the antenna beam "so as to keep the orientation of a beam . . . unchanged in the reference frame associated with the antenna in spite of modifications to the orientation of the illumination direction used by the beam . . . " CICERO will not use this method of control but instead will broadcast a constant radar beam downward over a wide angle. As noted previously, the receiving antenna beam shape can be arbitrarily modified after the fact by appropriately combining the data preserved from each element of the phased array antennas.

U.S. Pat. No. 6,870,500—Side looking SAR system, Mar. 22, 2005: This proposes a SAR antenna configuration not unlike that of U.S. Pat. No. 5,608,404 in which the observing aperture is "divided into a number of . . . sub-apertures arranged in the elevation and azimuth directions." Special real-time circuitry is used to phase shift each receive sub-aperture signal and sum them so as to maximize the resultant received signal amplitude. CICERO will not attempt any tailored, real-time phase shifting and combining of signals received at each antenna element. Once again, because CICERO will preserve the raw signal information received at each element of a phased array antenna, such phase shifting and signal combining can be performed in myriad ways on multiple received signals, without prior knowledge of their direction of origin, long after the data have been acquired.

U.S. Pat. No. 6,911,931—Using dynamic interferometric synthetic aperture radar (InSAR) to image fast-moving surface waves, Jun. 28, 2005: This proposes a particular differential method of processing InSAR data to image fast moving surface waves. The method uses radar data acquired from multiple moving platforms, generated by at least one transmitter. No particular constraints are required of the transmitter or receiver. Thus the method can be applied to CICERO radar data. This illustrates yet another special application to which the CICERO architecture lends itself.

U.S. Pat. No. 7,196,653—Imaging apparatus and method, Mar. 27, 2007: This proposes a SAR imaging technique in which multiple transmit beams illuminate a scene and the returns are processed with the use of independent ground elevation data to determine the receiver attitude in all three axes. This again is essentially a processing technique, involving the introduction of external information (viz., a priori ground elevation data), which appears to be applicable to CICERO data as well, though it should not be needed since each cell will precisely determine and report its own 3D attitude.

U.S. Pat. No. 7,348,917—Synthetic multi-aperture radar technology, Mar. 25, 2008: This proposes techniques for reducing the antenna size or increasing the swath width without increasing ambiguities in SAR imaging systems. It involves transmitting radar pulses at regular intervals having only a portion of the intended SAR bandwidth and then extrapolating the received signals to the full bandwidth. This rather specialized technique could in theory be implemented on CICERO, though at present there is no plan to do so.

U.S. Pat. No. 7,414,573—Method and apparatus for providing an integrated communications, navigation and surveillance satellite system, Aug. 19, 2008: This is something of a departure from the others in that it proposes not a remote sensing system but an integrated telecommunications and user positioning system, which can also report the user position to others. It comprises a constellation of satellites that broadcast positioning signals (like GPS) and provide two-way user communications (like Iridium, OrbComm, and Globalstar). It does not offer any capability for Earth remote sensing from space. It is nevertheless of interest here because CICERO, with its integrated transmit and receive functions for Earth observation and its need to communicate its gathered information between cells and to ground sites, will also, without modification, be able to provide ground and near-earth user positioning, messaging, and surveillance, though its principal function is Earth remote sensing. This points up the power and versatility that is achieved with the cellular design. The simple transmit, receive, and relay functions offer a great breadth of possible uses that today are achieved, if at all, with distinct and uniquely tailored system architectures. Many new uses will emerge that have not yet been thought of, as has happened with GPS itself.

Consider again the Earth missions of FIGS. 1 and 2: Once one has gone to the trouble of tailoring a spacecraft design for a particular set of specialized functions, one finds that: (a) the spacecraft becomes larger, more complex, and more costly; and (b) it can generally perform little more than those functions for which it was tailored. The more primitive operations of CICERO cells leave open a host of potential applications, much like the simple AND, OR, and NOT operations of a basic digital logic circuit can make possible almost any conceivable computation.

(d) Mission Concepts in the Open Literature

An extensive search of the relevant literature for novel mission concepts turned up essentially nothing beyond what we have described above. Most published ideas deal with variations on mission concepts already flying or proposed. Indeed, the most comprehensive attempt to gather new mission concepts was performed by the NRC Decadal Survey panel, which conducted an open solicitation (RFI) of new Earth mission concepts for the next decade and received scores of replies. The best of these are reflected in the recommended list shown in FIG. 2. If there is a mission concept out there resembling CICERO in its simplicity and generality, we have not discovered it.

BRIEF DESCRIPTIONS OF DRAWINGS

FIG. 1. Artists' renderings of 21 currently operating NASA Earth science spacecraft, including Landsat-7, Aqua, SAGE III, Cloudsat, EO-1, OSTM, TRMM, ACRIMSAT, TOMS-EP, Terra, TOPEX/Poseidon, UARS, GRACE, CALIPSO, ERBS, SeaWinds, ICESat, SeaWiFS, QuikScat, SORCE, and Jason-1; together with three NOAA satellites, including NOAA-N, GOES I-M, and GOES N-P. The NASA spacecraft are arranged in a ring around a picture of the earth; the NOAA satellites are shown inside the ring.

FIG. 2. A table showing the 15 Earth science missions recommended for NASA by a National Research Council study panel in 2007, along with their estimated costs. The missions include: CLARREO, SMAP, ICESat-II, DESDynI, HyspIRI, ASCENDS, SWOT, GEO-CAPE, ACE, LIST, PATH, GRACE-II, SCLP GACM, and 3D-WINDS. The mission costs as estimated by NASA average $711M in 2007 dollars.

FIG. 3. Conceptual sketch showing an array of dozens of small Earth sensing satellites, or "cells," in low Earth orbit. The conceptual cells are in the form of spheres having solar cells on the upper half and an array of patch antennas on the lower half. The cells have a nominal diameter of 60 cm each.

FIG. 4. Artist's rendering of the Terra-SAR-X radar imaging satellite.

FIG. 5. Illustration of the technique of GPS atmospheric radio occultation. The drawing shows a satellite in low Earth orbit receiving a signal emitted by a distant GPS satellite (not shown). The received signal, depicted as a narrow ray passing horizontally across the frame, is grazing the limb of the earth and thus passing through a portion of the earth's atmosphere at the tangent point before reaching the orbiting receiver.

FIG. 6. A drawing similar to that of FIG. 5 showing that while viewing an occulting GPS signal, a receiver in low Earth orbit may also detect an image of that signal reflecting off the earth's surface, at the horizon as viewed by the orbiting receiver. Thus the emitted GPS signal can reach the receiver along two separate paths. These can be independently detected and measured by the orbiting receiver.

FIG. 7. Block diagram of key components of the "core cell" for the proposed CICERO observing system. The cell is represented by a rectangular box with a GNSS receiver inside. Each CICERO cell will feature these key elements: an upward-looking GNSS antenna for navigation; limb-viewing GNSS antennas pointing in the forward and reverse velocity directions to observe the occulting and reflecting signals; and an onboard GNSS occultation receiver/processor (R/P). The R/P consists of front-end amplifiers and filters for each GNSS antenna and a digital signal processing (DSP) chip that can process and measure up to 96 GNSS signals in parallel.

FIG. 8. Artist's rendering of the GRACE mission, which consists of two Earth satellites separated by several hundred km exchanging radio crosslinks.

FIG. 9. Block diagram of key components of the GRACE spacecraft showing similarities and differences with the CICERO cells. A principal difference is that on GRACE the RO assembly on one end has been replaced by an antenna and front end module to send and receive crosslinks to and from the companion spacecraft. In addition, GRACE carries an accelerometer and an improved oscillator.

FIG. 10. Drawing similar to FIG. 9 showing both GRACE spacecraft, labeled GRACE-A and GRACE-B, side-by-side, exchanging crosslinks at 32 & 24 GHz.

FIG. 11. Drawing of key components of an enhanced CICERO cell designed to make high-precision measurements of the Earth's gravity field as part of an Earth Gravitational Observatory (EGO). The CICERO/EGO cell is similar to the GRACE spacecraft but has several improvements, including modulation of the crosslinks by pseudo-noise (PN) codes, higher crosslink frequencies, the ability to exchange cross-links with multiple EGO cells at once, and the ability to transmit data on the crosslinks to other cells. The drawing shows the code-modulated crosslink signals and the option to have GNSS RO on one end and crosslink exchange on the other (like GRACE) or cross-link exchange in both the forward and aft directions, with no GNSS RO at either end.

FIG. 12. Drawing similar to FIG. 11 showing two EGO cells side-by-side exchanging crosslinks between their facing sides and making GNSS RO observations from their outward-looking sides, in a manner similar to GRACE.

FIG. 13. Drawing of an EGO "interior" cell in which the GNSS RO antenna and front end have been replaced by a second crosslink system to enable crosslinking in both the forward and aft directions, as shown optionally in FIG. 11.

FIG. 14. Illustration of EGO operating in its "general mode" with N LEO cells aligned in a common orbit plane, or arc. The two end cells of the arc acquire RO observations in the outward-looking directions and exchange crosslinks in the inward-looking direction. The N−2 interior cells exchange crosslinks in both directions and do not perform GNSS RO. In this arrangement, all cells exchange crosslinks with all other visible cells. Thus 12 cells will yield 66 independent crosslink measurements.

FIG. 15. Drawing showing all ten possible crosslinks exchanged by five mutually visible EGO cells aligned in a common orbit arc.

FIG. 16. Illustration of the concept of crosslink occultation (XO) using signals exchanged between CICERO cells at frequencies higher than the GNSS L-band frequencies. The occultation geometry is the same as for GNSS RO, except that both satellites are now in low Earth orbit. The higher frequencies for XO are chosen near various absorption lines (e.g., for water vapor and ozone) and the XO observation includes a measurement of the amplitude reduction due to absorption as well as bending through the atmosphere. The drawing illustrates the reduced amplitude of the emitted signals after passing through the atmosphere.

FIG. 17. Drawing similar to FIG. 14 showing EGO operating in its general mode, with N cells aligned in an arc. The only difference is that the end cells no longer perform GNSS RO and instead exchange crosslinks in both directions. This allows all cells to perform XO with the cells of a second EGO arc in an opposing orbit.

FIG. 18. Illustration of two EGO-XO arcs in counter-rotating polar orbits within the same orbit plane. As the cells of one arc approach the cells of the other arc, a series of rising crosslink occultations will occur. If there are N cells in one arc and M cells in the other arc, a total of NM rising occultations will occur. As the two arcs move away from one another, another NM setting occultations will occur. This same sequence will take place on the other side of the earth, yielding 4NM occultations per orbit. The drawing also shows two "continuous" crosslink occultations. The first and last cells within each arc are spaced so that the communication path between them perpetually passes through the atmosphere in a continuously occulting geometry.

FIG. 19. Drawing offering a snapshot of two 12-cell, counter-rotating EGO-XO arcs passing one another, giving rise to multiple, nearly concurrent crosslink occultations. The drawing illustrates that the tangent points of the occultations near the surface of the earth are distributed over a rather long arc that is related to the lengths of the arcs and the distribution of cells within them.

FIG. 20. Drawing of a variant of the twin-arc EGO-XO configuration in which the cells of one arc are spread uniformly over a full ring around the orbit, while the cells of the other arc remain closely spaced to perform standard EGO gravity sensing. The arc and the ring are in counter-rotating polar orbits. The cells within the ring are spaced in such a way that alternate pairs (i.e., cells 1 and 3, 2 and 4, 3 and 5, etc.) are each in a continuous occultation geometry, as with the end cells of the two arcs in FIG. 18. Thus a ring of 12 cells will provide 12 continuous "within-arc" occultations in addition to the numerous rising and setting occultations with the counter-rotating arc.

FIG. 21. Drawing of a variant of the EGO-XO "arc-and-ring" formation of FIG. 20 in which the cells within the ring are distributed non-uniformly in such a way as to provide higher XO sampling density near the equator than near the poles. The cells are spaced most densely on one side of the ring and progressively less densely away from that side, with lowest density spacing occurring 180 degrees away from the densest part. The high-density part of the ring is phased to pass the counter-rotating arc over the tropics, with the center of the arc coinciding with the highest density point of the ring directly over the equator. The drawing shows the cells at exactly that point. The ring spacing can be designed to compensate for orbit convergence at the poles so that the resulting crosslink occultations are distributed nearly uniformly over the earth's surface.

FIG. 22. Drawing of the same orbit formation as in FIG. 21, after the arc and ring cells have completed another quarter orbit. Now the arc is centered over the North Pole and the densest part of the ring is centered over the South Pole. This shows that the lowest density XO sampling occurs over the poles.

FIG. 23. Drawing of another variant EGO-XO formation, this time with both sets of cells spread into full, counter-rotating rings, each with the non-uniform space of the ring in FIGS. 21 and 22. The two rings are phased so that the densest portions pass one another over the equator on each side of the earth.

FIG. 24. Drawing illustrating the concept of a "closure" measurement among three mutually visible cells exchanging crosslinks. The three cells form an arc in a common orbit plane. The two end cells are in an occultation geometry, with the crosslink between them passing through the earth's atmosphere. The two links from the end cells to the interior cell are therefore above the atmosphere. Precise relative velocity measurements made with the two non-occulting links are not subject to atmospheric effects and can be used to improve determination of the true velocity between the two occulting cells.

FIG. 25. Drawing showing another view of three cells in a closure geometry, with the two end cells in occultation. The drawing shows lines representing the three crosslinks, which form a triangle. It also shows lines from each cell to the center of the earth. There is also a line from the occultation tangent point to the center of the earth. Each line is labeled with the distance between its end points. All cells are 7100 km from the center of the earth and the distance between the two occulting cells is 6148 km. The interior cell is 200 km from the left end cell and 5967 km from the right end cell. The purpose of the drawing is to show conceptually how the small errors in velocity measurements between the two non-occulting pairs map geometrically into the calibrated velocity measurement between the occulting pair.

FIG. 26. Further detail of the three-cell configuration of FIG. 25. The three cells are labeled E1, E2, and E3, with E2 in the interior. The cells form a triangle. The angle at vertex E1 is 24.9 degrees and the angle at vertex E3 is 0.8 degrees.

FIG. 27. Block diagram of the EGO-XO spacecraft similar to FIG. 11, showing possible future enhancements to achieve performance improvements and additional functionality in the EGO-XO system. The drawing again shows a box representing the cell, having an up-looking GNSS navigation antenna and GNSS RO antennas pointing in the forward and aft velocity directions. This time it also has crosslink antennas pointing fore and aft so that it can simultaneously do GNSS RO, XO, and EGO gravity sensing with all cells. In addition, the crosslinks are now expanded to several additional frequencies to improve sensing of moisture and ozone and to enable sensing of other atmospheric constituents.

FIG. 28. Drawing showing a conceptual layout for a future CICERO cell to perform GNSS RO, EGO-XO, and more general "radio holography" from reflected signals. The drawing shows a disk-like cell, about one meter in diameter and 40 cm thick, with the flat surfaces facing up and down. The top surface carries a GNSS navigation antenna and solar cells. The bottom surface comprises a phased array antenna for receiving reflected GNSS and other signals. The sides are not straight up and down but have three segments: the upper 40% is canted back so the surface faces above the horizon and is covered with solar cells; the lower 40% is canted back so the surface faces the earth limb around the full 360 degrees of azimuth, and contains additional phased array antenna elements to collect both reflections and GNSS occultations; the middle 20% is vertical, and holds crosslink antennas pointing fore and aft, and some solar cells.

FIG. 29. Drawing of the conceptual CICERO cell, nearly identical to FIG. 28, but with an emitting antenna added in the center of the bottom surface. This adds active radar emissions to enhance the sensitivity of CICERO radio holography.

FIG. 30. Another drawing of the conceptual CICERO cell, essentially identical to that of FIG. 29, but this time labeled to indicate the principal features, including the up-looking GNSS navigation antenna, the solar cells on the top and upper sides, the radar emitting antenna on the bottom, the phased array receiving antenna elements on the bottom and lower sides and the fore and aft crosslink antennas on the central rim.

FIG. 31. Top view of a further enhanced CICERO cell. In this variation, the full top surface, which previously was populated with solar cells, becomes a large-aperture phased array L-band antenna for high-gain reception of GNSS signals. This greatly increases the precision of the up-looking GNSS measurements to further improve EGO gravity sensing.

FIG. 32. Side view of a CICERO cell illustrating a further enhancement: extension of the fore and aft crosslink function around the full 360-degree perimeter of the cell, to enable crosslink exchange with cells visible in all directions.

FIG. 33. Top view of a CICERO cell showing how the full 360-degree crosslink function can be achieved with several (in this case, eight) small crosslink antennas positioned around the cell rim.

FIG. 34. Drawing showing top, bottom, and side views of the CICERO cell with all functions included. At the bottom the drawing also shows a side view of the cell "stowed for launch." In the stowed position, the disk has been collapsed down to nearly the 10-centimeter height of the central rim, or beltline, to allow more cells to be fit on a single launch vehicle. After release, the cell is inflated to its operational dimensions.

FIG. 35. Top and side views of a slight variant of the CICERO cell configuration featuring a fold-out solar panel covering the top-side GNSS phased array antenna to provide more on-orbit power. The panel is hinged on one side and folds out past 90 degrees vertical, away from the body of the cell. In principle, more than one such panel can be overlaid if necessary, each hinged on another side of the spacecraft.

TECHNICAL DESCRIPTION OF THE INVENTION

The cellular architecture that underlies CICERO exploits modern digital and wireless technology to form an integrated, multi-function spaceborne observing system based primarily on the reception and emission of radio frequency (RF) and microwave signals. Radio technology is robust, cheap, ubiquitous, and exceptionally powerful as a tool for Earth remote sensing. This section presents the cellular concept in five parts, leading to a detailed functional description of the full Cellular Interferometer for Continuous Earth Remote Observation. The five parts cover:

1. The general cellular paradigm for Earth observation from space, involving dozens to hundreds of small cells in low Earth orbit (LEO), each performing similar or identical, relatively primitive sensing tasks, but which combine to execute a great variety of far more powerful observing functions. The core function of the baseline cellular array is GNSS atmospheric radio occultation (GNSS RO).
2. A specific extension of the core cellular array in the form of an Earth gravity field mapping system employing radio crosslinks between orbiting cells that will offer more than an order-of-magnitude improvement in measurement sensitivity over the best current technology—NASA's GRACE mission—at a far lower cost.
3. A further extension of the gravity mapping architecture involving additional, identical cells and unique orbit configurations, that integrates gravity mapping with so-called next-generation crosslink atmospheric radio occultation in a unified cellular design.
4. The concept of global radio holography (RH) in which many simple, low-orbiting cells receive and (optionally) transmit radio and microwave signals in the range of 100 MHz to 200 GHz, Nyquist-sample selected narrow bands of the observed spectrum, and preserve the essential information for later combination and analysis.
5. A practical cellular spacecraft and system design that realizes the full CICERO concept and that can be implemented with current technology to perform RH and a great diversity of derived sensing functions, including gravity mapping, atmospheric sounding, ocean scatterometry, radar altimetry and imaging, and ionospheric mapping.

Part 1. The Cellular Paradigm

Central to the cellular concept is the use of large numbers of small, simple LEO spacecraft (cells) in a globally distributed constellation, each performing similar or identical, relatively primitive sensing functions and returning raw data to be combined and processed in a variety of different ways to achieve diverse observational objectives.

FIG. 3 illustrates the concept of a large LEO array of nearly identical cells. The cells may range from 5 to 250 kg and are far simpler and cheaper than conventional remote sensing spacecraft, such as those in FIGS. 1 and 2. By "simpler" we do not mean functionally unsophisticated; rather, like a modern cell phone, the orbiting cells will be densely integrated, requiring relatively few components and manufacturing steps, and can therefore be produced cheaply in large numbers. High-density integration allows the cells to be functionally quite advanced. The distinguishing features of cells are large numbers and low mass, size, and cost. The cells may send their data to Earth by any convenient method, though for the baseline CICERO system they will employ commercial relay satellites, such as Inmarsat and Intelsat, which offer continuous global coverage.

"Atomizing" the Spacecraft and Signals

The cellular system decomposes diverse, complex spacecraft into more primitive observing elements arranged in a unified array of small cells. The cells in turn break down complex signals into basic signal elements, such as phase and amplitude or, more primitively, a series of sampled voltages received at the antenna elements. Key information in the observed frequency bands is preserved for later extraction.

Today we deploy highly specialized observing systems to perform unique functions—to obtain distinct kinds of information. An example is an imaging synthetic aperture radar (SAR), such as TerraSAR-X [1], shown in FIG. 4. Such systems are massive and costly ($300M and up), observe only a small portion of the earth at a time, and are restricted to a narrow set of applications. TerraSAR-X, for example, cannot measure ocean topography and circulation; for that we have other half-billion-dollar radar missions, such as Jason-2 (aka OSTM) [10]. But Jason-2 cannot do ocean scatterometry, so we also have QuickScat/SeaWinds [11]. And none of these can do altimetry over the polar caps, so we have IceSat [12]. And on and on. The cumulative cost of these large, specialized systems is staggering. By contrast, a cellular system can capture a great variety of observational information in a unified, low-cost observing system.

An apt analogy (on a tiny scale) is the programmable gate array for micro-circuitry [13]. In the past one needed to build custom "application-specific integrated circuits," or ASICs, to perform particular functions, just as we now deploy application-specific space missions. An ASIC can perform only those tasks for which it is designed. Today we have versatile, reprogrammable "gate arrays"—dense arrays of millions of identical cells that can be connected and reconnected in arbitrary ways to perform any number of functions, just as the raw data from a cellular space array can be recombined for multiple, unrelated purposes. A key difference is that a gate array can be connected to perform only one set of functions at a time. Raw data collected by a cellular space array can be combined and recombined to serve many different applications simultaneously, even future functions yet to be conceived. Examples of this are given in later sections.

Where Cost Savings are Achieved

The paradigm of many small LEO cells leads to a cascade of cost savings:

- The cells have far fewer components and lower mass than a conventional satellite and require far less power from solar cells and batteries.
- The radiation environment between 400 and 800 km, our preferred LEO altitude range, is benign and thus suitable for low-cost commercial components.
- Reliability is achieved through the number of cells—system-level redundancy—rather than by the costly "bullet-proofing" of each cell.
- This permits use of the latest high-density and non-heritage technologies, further reducing size, mass, and cost.
- Cells are produced in dozens or hundreds, introducing substantial economies of scale.
- As many as 50 cells can be placed into orbit on a single $15M launch vehicle.
- A cellular system can perform the functions of multiple LEO and GEO platforms.
- Cells are fully autonomous—"fire and forget"—requiring little or no ground support.

Depending on their specific functions and other implementation choices, individual cells may be produced in dozens or hundreds for as little as a few hundred thousand to a few million dollars each. The per-cell launch cost may range from $200K to $1M. A multi-function, 100-cell LEO array could thus be deployed for anywhere from $70M to $500M. In the world of space-based Earth observation, where a single focused mission may now cost $1B, this represents a revolution.

Ways of Exploiting Cellularity

The cellular concept can be applied to Earth sensing in several ways:

- Inherently small, simple sensors (e.g., GNSS RO sensors, magnetometers, laser reflectors) can be mass-produced and flown in large numbers to achieve far greater observational density and concurrent global coverage.
- More complex sensors (e.g., multi-spectral imagers, radiometers, sounders) can be built in simpler, lower-performance versions and flown in large numbers to achieve continuous global coverage and comparable or better aggregate performance.
- Sophisticated large aperture sensors (e.g., radar imagers) can be synthesized from raw data collected by many cells, with greater resolution and sensitivity. In this approach, a large billion-dollar platform may be "atomized" into a cellular array.
- Standard interfaces ("expansion ports") on each cell can allow unique sensors to be plugged into individual cells and deployed cheaply as part of system replenishment.

A virtue of the cellular paradigm is that it can combine the now distinct functions of high-performance LEO platforms, like NOAA's POES satellites, and geosynchronous Earth orbiters (GEOs), like NOAA's GOES satellites, which dwell on a fixed region from high above [14]. A global cellular array in low Earth orbit can observe all of the Earth all of the time, at close range. A typical LEO altitude of 720 km is one-fiftieth of the 36,000 km GEO altitude, enabling far greater resolution and sensitivity with simpler, more compact sensors. Large arrays at LEO can allow further simplicity of sensors, with improved overall performance from the combined data. A fleet of LEO cells can thus consolidate many functions of today's LEO and GEO super-platforms.

The Core of CICERO: GNSS Radio Occultation

The CICERO architecture builds on a well-established core function: GNSS atmospheric radio occultation. In GNSS RO a LEO satellite continuously tracks the signals from visible GNSS satellites (e.g., GPS, Galileo, Glonass) until they disappear behind the earth's limb; or, alternatively, begins tracking them as they rise from behind the earth's limb. As the observed signal disappears or emerges it must pass through the earth's atmosphere in a limb-grazing geometry, as shown in FIG. 5. The GNSS receiver on the LEO satellite records the basic signal properties: received voltages, carrier phase, frequency, amplitude, signal-to-noise ratio, polarization, and data modulation. From this information, later analysis can extract key properties of the atmosphere and ionosphere [15],[16]. The current COSMIC mission is demonstrating operational GNSS RO.

The core instrument on every CICERO cell will be an advanced GNSS RO receiver that can track the signals from many or all visible GNSS satellites at once. Each cell must have one or more broad-beam GNSS antennas pointing generally upward to track non-occulting GNSS signals for onboard navigation and timing, and at least two more-directional antennas pointing towards the earth limb, one in the forward velocity direction and one in the aft velocity direction, to observe occulting signals as they pass through the atmosphere. The limb-pointing antennas acquire not only the occulting signals but also reflections of those signals glancing off the earth's limb, particularly over water and ice, as shown in FIG. 6. The core cell configuration is illustrated in FIG. 7. We can think of this as essentially a GNSS RO receiver in a box, with the necessary complement of support systems. This is the basic architecture of COSMIC and other GNSS RO satellites and is not in itself an innovation. CICERO builds on these core functions to create a cellular observing system of far broader utility.

Summary:

In the cellular architecture, many small cells in low Earth orbit transmit and receive radio and microwave signals and sample and preserve the collected information. A single low-cost cellular array can perform the diverse sensing functions of a wide range of large, costly Earth observing platforms flying today. Benefits include: dramatically lower overall system costs; simultaneous coverage of the full global surface; improved performance from the aggregate return from many sensors; and consolidation of LEO and GEO functions into a single low-cost LEO system.

Part 2. Introducing the Earth Gravitational Observatory (EGO)

We extend CICERO functionality first by taking an established method of Earth gravity field mapping, represented by NASA's GRACE mission, and transforming it to greatly enhance its performance. This is done by augmenting the core CICERO design. GRACE, illustrated in FIG. 8, is a twin-spacecraft mission [18]. Its primary function is to make precise measurements of the changing relative velocity between the two spacecraft as a means of sensing small variations in the earth's gravitational field. Repeat observations at different times can reveal time variations in the field due, for example, to the changing mass of large ice sheets or movements of water around the globe. The means of measuring the relative velocity variations is a dual-frequency radio crosslink. The crosslink signals are pure sinusoidal tones at 24 and 32 GHz, each sent from one of the spacecraft and received by the other. Small changes in the observed Doppler shifts of the received tones reveal the relative velocity variations. GRACE also performs GPS radio occultation with antennas on the outward ends of the spacecraft.

FIG. 9 shows the functional layout of one GRACE spacecraft, which also centers on a GNSS receiver. The receiver can process 48 GPS signals in parallel. The same receiver collects and processes GPS navigation signals from above, occultation signals from the outward-facing end, and a crosslink tone from the inward-facing end. The spacecraft carries a precise accelerometer to calibrate "non-gravitational" forces acting on the spacecraft (e.g., solar radiation pressure and atmospheric drag) so as to expose the gravitational signal, and an ultra-stable oscillator (USO) to improve measurement precision. The second spacecraft is essentially a mirror image of the first. Thus at one end each spacecraft contains a crosslink ("x-link") module to transmit and receive a crosslink tone and feed the received tone into the digital signal processor (DSP), and at the other end it contains ordinary GPS front-end electronics connected to a GNSS RO antenna. FIG. 10 illustrates the two spacecraft operating together, providing a single, one-dimensional (line-of-sight) relative velocity measurement.

Innovations for CICERO/EGO

A few enhancements to the core CICERO design can generalize and "cellularize" GRACE to create EGO, in the process improving on GRACE performance by more than an order of magnitude. (EGO can be thought of as a sub-function of the general CICERO system—or as an intermediate and incomplete implementation of the general Cellular Interferometer—as laid out in Part 5.) The first step is to reproduce the basic GRACE functions illustrated in FIGS. 9 and 10. Thus, on some or all CICERO cells, we replace the RO assembly on one end (FIG. 7) by a dual-frequency crosslink module, and add a high-performance accelerometer and oscillator. Specific additional enhancements to realize a general multi-cell EGO include the following:

- The crosslink tones are modulated by selectable pseudonoise (PN) spread spectrum codes, much like the C/A- and P-codes that modulate GPS signals.
- The crosslink signals may also carry data between the cells.
- The low crosslink frequency is reduced from 24 to 22.5 GHz.
- The high crosslink frequency is increased from 32 to 60 GHz.
- The GRACE GPS receiver is replaced by a general GNSS (GPS/Galileo/Glonass) RO receiver having at least 96 parallel processing channels.
- The one remaining GNSS occultation module can be swapped out for a second crosslink module on selected cells.
- Any number of receiver processing channels can be assigned to process crosslinks.

The modified configuration is shown in FIG. 11. Note that here we have either GNSS RO or a second crosslink module on the left side. Later versions will include both modules on both sides. That is incidental here; the critical innovation is the ability of each spacecraft to receive and process multiple crosslinks transmitted on the same frequency, distinguishing them by their different PN codes. This is what makes possible a unified multi-cell chain for enhanced gravity field mapping.

EGO in Basic Twin-Cell "GRACE Mode"

When operated like GRACE in a simple twin-cell mode, EGO will be essentially the same as GRACE, with the exception that:

- The crosslinks frequencies are different.
- The crosslinks are modulated by pseudonoise codes.
- Data may be exchanged between cells.
- GPS and Galileo signals are observed.
- Overall performance will be improved.

The twin-satellite EGO mode is shown in FIG. 12. The higher frequency 60 GHz tone reduces the measurement error (compared with GRACE's 32 GHz tone) from residual ionospheric delay by more than a factor of four, and the errors from thermal noise and signal multipath, which are both proportional to wavelength, by about a factor of two. Joint GPS/Galileo/Glonass [19],[20] reception also enhances gravity recovery, though to a lesser degree. The net improvement is roughly a factor of two over GRACE.

EGO in General N-Cell Configuration

The power of the EGO design is fully realized only in its general N-cell configuration, where $N \geq 3$. To create that we insert $N-2$ identical "interior" cells between the two cells used for the dual-cell mode. The interior cells, illustrated in FIG. 13, have replaced the RO module with a second crosslink module. All interior cells transmit the first crosslink frequency (X1) in a common direction and the second (X2) in the other direction, and receive the complementary signals. The crosslinks transmitted by each cell are modulated by a unique PN code.

The general configuration is illustrated in FIG. 14. In this example the end cells still perform GNSS occultation from their outward-looking ends. Note that all cells can receive and process the crosslinks from all other cells, separating them by their unique PN codes. This yields a total of $N(N-1)/2$ independent links. Sixteen cells thus yield 120 statistically independent crosslink velocity measurements, each about a factor of two more precise than the single GRACE velocity measurement. Because the cells form multiple baselines with lengths ranging from ~100 km to more than 5000 km, the EGO chain of cells is sensitive to a far broader range of gravitational wavelengths than is GRACE, which maintains a separation of about 220 km and is most sensitive to gravity wavelengths of 500-2000 km. Since the number of EGO links increases as the square of N, the ultimate measurement precision (which goes as the square root of the number of links) improves in proportion to N. Moreover, since the multiple EGO crosslinks span a two-dimensional plane rather than a one-dimensional line between two spacecraft, they provide additional geometrical strength to the gravity solution beyond that resulting simply from the increase in the number of links. As a result, a system of 12 or more cells can improve on the GRACE velocity measurement precision by more than an order of magnitude. FIG. 15 sketches the ten observable crosslinks available with five EGO cells.

Uniqueness of the EGO Design:

In 2006 and 2007 NASA conducted a comprehensive design study for an enhanced GRACE mission ("GRACE-2") proposed to fly around 2016. All current gravity mission concepts were evaluated in detail. None of these included a system of more than two LEO satellites. The study ultimately produced a twin-satellite mission concept similar to GRACE, carrying enhanced accelerometers and a GPS-Galileo receiver. The estimated cost was $471M in FY07 dollars (FIG. 2). By contrast, EGO cells can be produced in quantity for 3-4 $M each, and as many as 18 deployed on a single 10-15 $M launch vehicle, such as the Falcon-1e from SpaceX [21]. GRACE-2 represents the current art in gravity mission concepts. No multi-satellite LEO systems for gravity measurement resembling EGO have been proposed elsewhere.

Key characteristics of EGO include the following:
All interior cells are identical.
The cell design is fixed and independent of N.
The observing chain can be easily expanded by inserting new cells.
The 60 GHz link gives a more precise range rate measurement:
Lower thermal, ionospheric, and multipath errors
The single-link range rate error will be of order 1 µm/s.
The measurement error goes down as 1/N (not 1/√N).
Multi-link closures provide added observing strength.
GNSS phase ambiguity resolution can further strengthen the gravity solution.
The chain of cells is sensitive to a broad range of wavelengths.
Each EGO cell can be made the size of a small briefcase.
Twenty cells can be launched on a single Falcon-1e rocket.

In the following sub-sections we briefly elaborate on a few of these points.

Geometrical Strength of Multi-Link Closures

The canonical twin-satellite GRACE configuration reveals the relative velocity variations only along the single dimension of the crosslink. This fundamentally and substantially limits the observability of the gravitational field at the altitude of the orbit, and even more so in the projection of the field down to the Earth's surface ("downward continuation"). The observation is inherently ambiguous. The gravity field is typically represented in the form of an expansion into "spherical harmonics." This observational ambiguity equates to significant correlations among—and hence poor separability of—various combinations of spherical harmonics in the estimated field. The interpretation of the velocity variations at altitude in terms of mass distribution on and within the earth is therefore problematic and requires imposition of a priori model constraints to be done at all. As we have seen with GRACE, this can still be of great scientific value, but it is far from ideal.

The EGO configuration improves on this fundamentally. As we see in FIGS. 14 and 15, simultaneous multi-link observations across an arc of cells provide continuous visibility, at the few µm/sec level, of their relative motions in both dimensions of the orbit plane. If the arc of cells extends around the horizon so that one end cannot directly see the other, we can still infer the relative motions of all cells by connecting the links. If we think of the crosslinks as structural members, we see that the multi-cell configuration offers a 2D rigidity absent in a single crosslink. Mathematically, this 2D geometrical strength breaks, or substantially reduces, correlations among harmonics and thus improves the resulting gravity field estimates well beyond the simple "square-root-of-n" effect of the increased data volume obtained from multiple cells.

Dynamical Strength—Eliminating Accelerometers?

A multi-cell EGO arc provides continuous observation of the relative 2D motions of all cells. We note that these motions must at all times be mutually dynamically consistent under Newtonian orbital mechanics. This provides a powerful dynamical constraint that contributes to the breaking of correlations among spherical harmonics and thus improves the gravity field estimate. It may also have a further effect that, if strong enough, can simplify the system design.

All cells are subject to both gravitational forces (also called "conservative" forces since they do not alter the total energy of the system) and non-gravitational forces (usually acting on the surface or at a localized point). These two types of force act on the cells in fundamentally different ways, one type altering the total energy of the system and the other not, thus allowing them to be separated in a dynamical orbit solution—up to a point. If they could be separated perfectly simply by their dynamical signatures, GRACE would not have to carry precise accelerometers to calibrate the non-gravitational forces. The 2D observation of relative cell motion at the µm/sec level offered by EGO will substantially improve our ability to separate gravitational and non-gravitational forces purely by their dynamical signatures, possibly to the point of eliminating the need for accelerometers altogether. Just how far this can be carried remains to be quantified, but we claim this as a potential benefit from the multi-cell EGO configuration.

Multi-Link Closure for Automated Anomaly Detection and Diagnosis

The multi-link closures also have powerful application for spacecraft health monitoring and diagnosis. A prime example is the detection and analysis of anomalous behavior on one cell that has the appearance of a spurious acceleration, such as might be caused by a defective accelerometer or a slow gas leak. In principle, identical cells flying close together in identical orbits will experience similar non-gravitational accelerations. To monitor this automatically we can take the data series produced by accelerometers A1, A2, and A3 from three different cells, pass them across the data links between cells, offset them in time to align them to a common point in their orbits, and form pairwise differences: A1−A2, A2−A3, and A3−A1. These differences will reflect (a) accelerometer measurement errors and (b) real differences in non-gravitational accelerations.

Suppose there is anomalous behavior at one cell: a noisy accelerometer or an unusual non-gravitational acceleration. Difference statistics from a GRACE-like pair cannot determine at which end the anomaly is occurring or, indeed, whether there is an anomaly at all. (This has been a problem with GRACE, which has a balky accelerometer on one vehicle.) Triple pairs around a loop can instantly detect and isolate the anomaly and reveal its magnitude, spectrum, and other statistics for rapid, automated diagnosis. Similar pairwise differences of crosslink phase data or GPS/Galileo measurements can be used to isolate and examine oscillator behavior and other performance issues.

Limitless Expandability

A central feature of this design, enabled by the software-selectable code modulation on the crosslinks, is that we can exchange multiple concurrent crosslinks among an unlimited number of cells that are themselves identical, that transmit and receive at exactly the same frequencies, and thus that can be produced cheaply in quantity with no deviations. (Even the GRACE spacecraft are not identical: one transmits 24 GHz and receives 32 GHz and the other does the opposite.) We've chosen here to show the end cells doing GNSS RO and the interior cells not, but we can just as easily eliminate RO (see next section) or include it on all cells (a planned later enhancement).

Nothing in the design of the cells depends on the number of cells to be included in the chain. The chain is arbitrarily expandable and readily maintainable simply by inserting identical additional (or replacement) cells. One could start with a short chain—as few as two—and expand to two-dozen or more over time. By being mass produced and flown in large numbers, giving system-level redundancy, the cells can be extremely low-cost (<$3M each) and the observing system augmented and maintained indefinitely by putting up occasional new cells on low-cost launchers. This can be included in routine operations costs. There will be no need to design, propose, and approve a new mission, as we must with all other Earth observation missions, but simply to maintain operations funding. As it stands now, because of the estimated cost of GRACE-2, NASA cannot consider flying a GRACE follow-on until at least 2016, and that mission will offer just a single crosslink.

EGO embodies virtually all of the economies of the cellular paradigm. With these economies we can deploy a 16-cell (120-link) autonomous EGO system for under $100M. This can be maintained for an operations cost of about $10M/year.

Summary:

The essential innovation here is a concept for identical cells that can be built cheaply in large numbers and placed into Earth orbit on a single small launch vehicle, to operate together as a gravitational observatory. Critical to this design is the use of selectable spread-spectrum (PN code) modulation on high-frequency radio crosslinks to allow an arbitrary number of identical cells to operate smoothly together to form an integrated observatory. A 16-cell EGO will improve on GRACE-2 performance dramatically, be readily expandable, cost far less, and offer unique 2D closure links.

Part 3. Twin-EGOs with Crosslink Occultations (EGO-XO)

For the past decade scientists in several countries have been seeking to develop the "next-generation" radio occultation technology for sounding the atmosphere [22]-[24]. This involves the active exchange of radio crosslinks among multiple LEO satellites as pairs of satellites pass into an occultation geometry—i.e., when the line-of-sight between them passes through the atmosphere at the Earth's limb. The unique aspect of this approach is that it will employ much higher frequencies than the L-band signals now used in GNSS RO and it will observe not just the bending of the signal through the atmosphere but the degree of absorption (reduction in received amplitude) of carefully chosen crosslink frequencies, as illustrated in FIG. 16. Frequencies can be chosen near RF absorption lines for water vapor (22.7 and 183 GHz), ozone (195 GHz), and other species, permitting direct sensing of the concentrations of those species at different altitudes. In contrast with GNSS RO, for which we already have abundant signal sources in space, any realization of next-generation RO (which we will abbreviate XO, for crosslink occultation) will require launching the emitters as well as the receivers, a potentially costly proposition. As yet no practical designs to achieve useful global coverage—thousands of profiles per day—have been put forward.

A key perception behind this innovation is that EGO gravity mapping and XO both involve RF crosslinks between low-orbiting satellites and both require similar, near-polar orbits to achieve the desired coverage. Fortuitously, one of the critical water vapor RF absorption lines (22.7 GHz) is very close to the 24 GHz lower frequency now used by GRACE. With these things in mind we have conceived EGO to serve the dual functions of a gravitational observatory and next-generation XO constellation. No design modifications of EGO are needed to accommodate the XO functions. All we require are additional EGO cells placed into complementary orbits producing crosslink occultations.

The 22.5 GHz EGO crosslink frequency was chosen to provide sensitive moisture sounding in the upper atmosphere where the moisture concentration is low. Other frequencies further from the 22.7 GHz water line can be chosen for moisture sensing lower in the atmosphere, where the concentrations are higher. The 60 GHz link is used only for "conventional" refractivity-based RO, as is done with GNSS. Compared with GNSS, however, the 60 GHz link along with the multiple 2D closure links for precise calibration offered by the multi-cell system design (described later) more than doubles the altitude ceiling—to more than 60 km—for which we can obtain accurate atmospheric temperatures. Later augmentations of EGO will feature multiple additional frequencies for both moisture and ozone sounding.

The central innovation here is the dual use of selected radio crosslinks among multiple cells, modulated by PN codes, for sensing both the gravity field and the atmosphere simultaneously in a unified observing system, together with unique orbital configurations to provide nearly optimal global coverage. The proposed orbital configurations are described in the following sub-sections.

Baseline EGO-XO

FIG. 17 illustrates a single EGO-XO chain. The only difference from the earlier EGO configuration is that we have dropped the GNSS RO sensing by the end cells in favor of XO links in both directions to maximize the XO opportunities. All cells, end and interior, are now identical. (As system miniaturization advances, later versions will restore GNSS RO to all cells, keeping them all identical.) To make this work we require additional cells in complementary orbits to produce large numbers of XO opportunities. Since we desire EGO to be in a near-polar orbit for global gravity sensing (and for other reasons) we choose to place the new EGO cells in the same, or nearly the same, orbit plane, but in opposing or counter-rotating orbits. For some purposes, explained further below, the orbit altitudes and eccentricities need not be the same for the two chains.

FIG. 18 illustrates our baseline "twin-arc" XO configuration, with two chains in nearly counter-rotating, near-polar orbits. Keeping the orbits nearly polar not only offers full global coverage, it allows us to fly the two chains at different altitudes without their orbit planes gradually precessing apart (a consequence of the gravitational tug of the equatorial bulge) and reducing the XO opportunities over time. We note the following properties for this configuration:

Each chain continues to perform EGO gravity sensing.
The fore and aft crosslink frequencies are reversed in one chain (i.e., the cells are flown "backward") to engage with the links in the other chain.
Both rising and setting occultations will occur on both sides of the earth on every orbit, each time the chains approach and pass one another.
With N cells in one chain and M cells in the other, we will have:
  NM profiles both rising and setting, each time the chains pass;
  Yielding a total of 4NM crosslink profiles every orbit;
  Or more than 60NM crosslink profiles every day;
  12 cells in each chain will thus give ~9000 XO profiles/day.

In a new twist on crosslink occultation we note that two cells within each chain (here shown as the end cells) can be positioned so as to provide a continuously occulting link sweeping through the atmosphere around the orbit (blue dashed lines in FIG. 18). The earth's oblateness will cause this link to move up and down through the atmosphere as it moves around the orbit. The link may at times rise above the atmosphere to provide a zero-refractivity calibration. By making small adjustments to the orbit eccentricities, we can either exaggerate or suppress this effect. How best to exploit this novel type of occultation remains to be studied; however, it shows great promise of providing information complementary to the standard rising and setting occultation profiles. We note that just a small shift forward of the rear cell in the continuously occulting pair will remove the occultation and restore the link for use in EGO gravity sensing.

FIG. 19 offers a snapshot of two 12-cell EGO-XO chains as they pass. (The gravity links are omitted for clarity.) As the chains pass, many nearly concurrent occultations will occur over a fairly long surface arc. With the chains at different altitudes and thus having different orbital periods, the coverage can quickly spread around the globe, though, depending on the specific orbital parameters, several days may be required to obtain comprehensive global coverage. Recognizing that two full EGO gravity chains may be excessive, we describe two alternative orbital schemes that offer several advantages.

EGO-GXO: Global Daily XO Coverage

FIG. 20 shows what we call the EGO "GXO" configuration, for Global XO coverage. For GXO we've spread one chain into a uniform ring to provide:

12 long-wave EGO links (black dashed lines)
12 continuous (in-chain) XO links (blue dashed lines)
9000 standard XO profiles/day (red dashed lines)

This configuration will deliver a standard XO profile roughly every 10 sec, uniformly around the ground track. It therefore provides full global coverage every day, though with higher concentrations at the poles since every orbit will pass over or near the poles. To achieve the 12 continuous occultations within the ring, the altitude for 12 ring cells must be almost exactly 1000 km. If we increase the ring population to 14 cells the required altitude lowers to 714 km, which is ideal for CICERO's various observational purposes. Thus 14 ring cells may be optimal for this configuration. While this arrangement offers a good mix of long and short wave gravity sensing and global daily XO coverage, other variations offer different advantages.

EGO-UXO: Uniform Daily XO Coverage

We can obtain nearly uniform geographical XO coverage by varying the spacing around the ring, in the manner shown in FIG. 21. This formation provides:

Standard EGO gravity sensing
Added mid and long wave EGO links
Multiple continuous XO links
9000 cross-chain XO profiles/day There are, however, some complications. Now the chains must be carefully phased so that the densest part of the (green) ring cells passes the (red) "arc" cells directly over the tropics, where the higher sampling density is needed—preferably so that the mid-points of the two pass exactly over the equator, as shown here. The arc cells may be uniformly spaced. The two chains must also have identical orbital periods to maintain this phasing and thus careful orbit maintenance (and perhaps more fuel) will be needed to preserve this. If we choose nearly circular orbits for both chains, we may want to offset the orbital node (i.e., equator) crossing points slightly to ensure safe separations when opposing satellites pass. We can also introduce differing orbit eccentricities among cells to break up the regular geographical sampling patterns that result with circular orbits for all cells.

FIG. 21 shows the mid-point of highest-density XO sampling in the tropics. Roughly 25 minutes later the arc cells are centered over the North Pole (FIG. 22), coinciding with the sparsest region of the ring cells, thus yielding lowest sampling density (per orbit) at the poles. This pattern repeats over the opposite side tropics and the South Pole. We can tune the ring spacing to closely compensate for the convergence of orbits at the poles and thus achieve essentially uniform geographical XO coverage.

A simple variation on this is to have two similar (perhaps identical) variably spaced counter-rotating rings, rather than a ring and an arc, as shown in FIG. 23. This would achieve the same degree of geographical uniformity while sampling more parts of the globe concurrently. It would, however, alter the mix of EGO gravity links since the arc cells would now be more widely dispersed. We can counteract this by adding a few more cells to at least one ring, though at some additional cost. Based on the cost figures cited previously, if an EGO-only mission has been previously deployed, a 14-cell counter-rotating XO complement (which involves no changes in the EGO cell design) can be added for less than $60M. This will offer a robust mix of long and short wavelength gravity sensing along with nearly uniform global, high density XO coverage.

Multi-Link Closure Calibration of Estimated XO Velocity

We have always thought of an atmospheric occultation as a two-satellite affair: the two ends of the occulting link. But the presence of multi-cell closures within the occulting chains, with at least one cell not participating in the occultation, offers us a precise means of calibrating the observation and thus raising the maximum altitude for which we can obtain accurate RO temperatures: from about 30 km with conventional GNSS RO to well above 60 km—above the top of the stratosphere—with EGO-XO.

Closure calibration is illustrated in FIG. 24. A key step in recovering an RO temperature profile (the "retrieval" process) is estimating and removing the true (geometric) velocity between the occulting satellite pair to isolate the effect of the atmosphere on the observed Doppler shift. This must be done by means independent of the occultation measurement. The best current method is precise orbit determination (POD) performed with the GNSS signals acquired by the upward-looking navigation antenna(s) [25]. This method can determine the true relative velocity between occulting satellites (V3 in FIG. 24) to at best 0.1 mm/sec (100 μm/sec) [16]. Since our crosslink range rate measurement is precise to 1-2 μm/sec, the POD error becomes by far the dominant error in the XO retrieval. (With longer-wavelength GNSS RO, other error sources, such as thermal noise and ionospheric effects, bring the total RO velocity error typically to 0.5-1.0 mm/sec, so the POD velocity error is generally not the dominant concern.) The additional non-occulting closure links can be exploited to bring the velocity correction into line with other retrieval errors.

With the three-way links shown in FIG. 24 we can directly measure both V1 and V2 to 1 or 2 μm/s. These will provide a strong correction to the GNSS-based POD solutions, reducing the V3 error to below 10 μm/s. This can be further improved with more than three cells in the loop and by using pre- or post-occultation direct V3 measurements in the POD solution. Taking into account all errors, the total error of the XO velocity measurement will now be <10 μm/sec, or nearly two orders of magnitude lower than with conventional GNSS RO. This allows us to double our altitude ceiling.

The density of the atmosphere decreases exponentially with altitude. Typically, the density decreases by a factor of ten for an altitude increase of 18 km [16]. That means that in the temperature retrieval, every factor of ten reduction in our total measurement error increases the effective altitude ceiling for RO temperature retrievals (i.e., the altitude for which our temperature error is below a specified level, say 1 K) by about 18 km. Thus the presence of multiple non-occulting crosslinks provided by our multi-cell system can boost the 1 K temperature ceiling from ~30 km with GNSS RO to above 60 km. A simplified geometrical analysis of the closure calibration is given below.

Closure Calibration Analysis

For this discussion we refer to FIGS. 25 and 26, which depict typical geometries for three EGO-XO cells, E1, E2, and E3, flying at 720 km altitude. An occultation is occurring between E1 and E3, with the tangent point at that instant about 20 km above the surface, or about 6400 km from the center of the earth.

The initial POD solutions for the relative 2D velocities between pair E1-E2 and between pair E2-E3 can be resolved into components parallel and transverse to the respective lines of sight, A and B (FIG. 26). To correct the POD velocity solution along C we first replace the POD solution components along A and B with the far more precise rates observed by the E1-E2 and E2-E3 crosslinks. In concept, we project those corrected rates onto C, in this case by multiplying by cosine 24.9° and cosine 0.8°, respectively. We then project the uncorrected POD solutions transverse to A and B onto C. (Because E1 and E2 are identical spacecraft flying close together in a common orbit, the POD relative V along A will be ≤10% of the absolute V error, or <10 µm/s.) In the example shown, those errors are scaled down by 0.42 (sine 24.9°) and 0.014 (sine 0.8°) for A and B respectively. The larger POD error transverse to B is thus scaled down dramatically; the much smaller error transverse to A is still reduced significantly. The result is a net reduction of the POD velocity error along C from 100 µm/sec or more to the vicinity of 5 µm/sec.

This geometric description of closure calibration is conceptual. In practice we simply include all crosslink and GNSS data in the POD process and the information is optimally exploited in the V3 solution, with further improvement from multiple links and from powerful dynamical constraints. This error analysis is therefore pessimistic.

Optional Enhancements

While EGO-XO as presented above illustrates the principal benefits of the many-cell crosslink approach to joint gravity and atmospheric sensing, many variations and elaborations are possible. Some of these are illustrated in FIG. 27 and include:

Expanding the 22.5 GHz moisture link to four or more frequencies (e.g., 22.5, 17.0, 13.5, and 10.0 GHz) to sense moisture more accurately at all altitudes;

Adding 118, 195 and 183 GHz crosslinks for ozone sensing and more precise moisture and gravity sensing;

Restoring GNSS-RO sensing fore/aft on all cells so that all remain identical;

Adding optical and infrared laser crosslinks and/or solar occultation sensors (not shown) for broader atmospheric chemistry applications.

Summary:

This innovation concerns the simultaneous dual use of inter-satellite crosslinks at radio and microwave frequencies ranging from 10 GHz to 200 GHz (and higher as future technology permits), together with specially tailored, counter-rotating orbit configurations of multi-cell chains to produce large numbers of globally distributed crosslink occultation profiles, while also producing continuous global gravity maps of unrivalled precision. A key feature of this concept is that it requires no modification to the simple EGO gravity mission design, merely the addition of LEO cells in carefully chosen counter-rotating orbits. It also introduces the unique power of multi-cell closure calibration that results in a reduction by nearly two orders of magnitude in the overall XO velocity error, in turn permitting an increase of more than 30 km in the altitude ceiling for precise temperature retrievals. This illustrates the cellular principle of acquiring relatively primitive measurements from an array of small, low-cost cells for use in diverse sensing applications. The final two parts carry this principle much further.

Part 4. Global Radio Holography (RH)

The EGO and EGO-XO configurations represent somewhat specialized realizations of the cellular system concept. The principal characteristics they have in common are (1) they continuously observe all visible GNSS signals from zenith down to the earth's limb; (2) they transmit and receive RF and microwave crosslinks of various frequencies among cells for both remote sensing and information exchange; and (3) they are implemented in identical small, cheap cells that can be launched in large numbers on a low-cost launch vehicle. This basic model can be generalized to perform a far greater variety of sensing functions in a method best described as global radio holography (RH). The innovation here is the overall RH concept (though we are not the first to use the term, our realization is much truer to the holographic idea) and an efficient general approach.

Approach

To perform RH we first extend each cell's field of view over the full sphere surrounding it: not just from zenith to the earth's limb but downward over the full disk of the earth as well. Within this field of view, each cell will transmit and receive radio and/or microwave signals in selected frequency bands and will record the amplitude and phase information of the received signals, or blindly Nyquist-sample the appropriate passbands. Each cell will do this independently at a large number of sensing elements on its surface, recording the bits acquired at each element, thus allowing its aperture to be focused at full gain on any point below, long after the bits have been recorded.

By this simple approach, a great variety of radio and radar sensing systems, which are now implemented on separate, massive platforms, each costing $500M or more, can be "atomized" into a unified array of cheap cells. The preserved raw data from the collected cells can be combined and recombined in unlimited ways to synthesize the functions of diverse and costly observing systems, and even perform new functions for which no systems have yet been devised.

We stress that this concept goes well beyond the idea of using ambient RF signals ("radio daylight") to observe the earth. That is not new and any large-aperture radio receiver in space can be used for that purpose. The novelty of the RH concept, and of the designs we shall describe, is three-fold:

Selected segments of the observed RF band are blindly "Nyquist-sampled" by many small "dumb" cells, at many independent antenna elements on each cell, without regard to the specific purposes to which the collected data may be put.

The data from each antenna element of a cell can be combined in multiple ways to focus the cell at arbitrary points below, and the data from multiple cells can be further combined to synthesize large apertures and achieve far higher gains and resolutions.

A great diversity of highly specialized sensing functions can then be realized with the same set of raw data, focused at full system resolution, in near real time or after the fact, on any point on Earth; all critical information is preserved in the raw sampled data.

A generic concept for such a cell is shown in FIG. 28. A small up-looking antenna observes GNSS (and possibly other satellite) signals in the upper hemisphere. Antennas for crosslinks are located on the rim around the midsection, and RF patch antenna arrays pointing to the limb and nadir cover the canted sides and the bottom surface. To achieve a reasonable aperture (at least 20 dB of downward gain at L-band) the cell diameter should be about 1 meter. With today's miniaturized electronics and telecommunications versatility, the components and subsystems required to operate the cell can be fit into a small fraction of this envelope. We note that in its pure form, the cellular RH system will generate a large volume of raw data. For purposes of describing the RH concept we can ignore that challenge. In practice there are numerous strategies for reducing the bit volume by orders of magnitude while sacrificing rather little information content. We will describe some of these in future patent applications.

A global array of dozens or hundreds of cells, each with many independently sampled antenna elements, will allow the entire earth to be observed continuously, the observable RF signals sampled and recorded, and arbitrary points on the surface selected for close scrutiny long after the observations have been made. The observed RF signals may come from a variety of sources: (1) they may be received directly from other cells or satellites or from transmitters on or near Earth; (2) they may be reflected "signals of opportunity," such as those broadcast by GNSS, telecom, and other Earth satellites; (3) they may be reflections of signals purposely broadcast by the observing cell itself or by other cells in the RH array.

A Selection of Applications

Examples of specific sensing functions that can be achieved with a unified cellular observing system include, but are not limited to:

Standard surface altimetry and topography (ocean, ice, land) with reflected RF signals;

Precise surface change detection with interferometric synthetic aperture radar (InSAR);

Continuous synthetic aperture radar (SAR) imaging of the surface with resolutions as high as 10 cm, achieved with large sparse apertures formed from multiple cells;

Sensing of vegetation and ground cover, as well as surface geological properties, from the distinctive characteristics of reflected signals;

Sensing of sea state and ocean surface winds from reflected signals ("scatterometry");

Sensing of soil moisture and snow cover from surface reflectivity characteristics;

Atmospheric radio occultation (refractivity, density, pressure, temperature, moisture, geopotential heights, winds aloft) from observed radio signal bending;

Atmospheric chemistry (observing concentrations of atmospheric constituents) and sensing of aerosols from RF and microwave absorption;

Continuous 3D mapping of the global ionospheric electron distribution;

Geomagnetic storm detection and forecasting;

High-resolution time-varying gravity field mapping.

We will not describe in detail how each of these functions may be realized. Suffice to say that the basic information for each of them is inherent in the recovered signals and that this information is preserved by continuously recording the fundamental signal properties—principally the amplitude and phase and their time variations in a variety of frequency bands—much like the changing 3D properties of an object can be captured in a sequence of optical holograms that record the phase and amplitude of reflected light. Neither will we describe the various signal structures that may be used for the signals emitted by the cells. The possibilities are vast and the choices will depend on specific observational objectives. For many purposes a signal structure resembling that of the GNSS L1 and L2 signals will suffice. Simply Nyquist-sampling the in-phase and quadrature components of selected RF bands and saving the samples can capture all of the RF information needed for these functions. Examination of the operating principles of conventional sensors and systems designed for any of these specific purposes, and many of the earlier patents cited herein, will suggest how the preserved RH signals may be processed to accomplish the same ends. For example:

Standard radar altimetry is achieved by precisely measuring the time delay of the signal from transmission to reception, something easily accomplished with high precision from reflected GNSS and other satellite signals, which are specially designed to encode the required timing information; we can recover this with centimeter accuracy;

Scatterometry looks at the received amplitudes vs. direction, the received signal waveforms and spectrum as altered by the reflecting surface, signal polarization, and detailed phase information to ascertain sea state, wave heights, surface vector winds, even ocean temperature—information that is preserved in our observations;

Similar characteristics in signals reflected from land areas can reveal soil moisture (signal amplitude and polarization), vegetation cover and canopy height, terrain roughness, and surface geological properties;

Phase and amplitude information from captured reflections can be combined by well-known means to form SAR images and to perform Interferometric SAR detection of subtle centimeter-level surface changes by comparing images taken over time;

The dual-frequency GNSS phase data acquired by many orbiting cells can be combined to form high-resolution 2D and 3D images the global ionosphere by tomographic techniques described in the scientific literature [26];

The early onset of geomagnetic storms can be detected by their effects on the shape, structure, and dynamics of the ionosphere [27];

And of course the methods of radio occultation (bending and absorption) and gravity field mapping with GNSS and crosslink signals have already been described.

It is fair to say that the diversity and limits of the information to be gleaned from the holographic preservation of ambient RF signals observed from LEO have yet to be fully explored. Once even a rudimentary RH observing system is in place, scientists will have a great expanse of fertile new ground to plow.

How this can be made to Work

There are unique features that distinguish CICERO from conventional space-based RF observing systems. One is simply the strategy of sampling and preserving RF signals from all directions for later (or near-real-time) recombination. Another deals with the practical problem of efficiently recombining the data from many independent, free-flying cells so as to form coherent, quality images and other synthesized products.

To synthesize an image from signals collected at multiple observing points the data must first be coherently combined. That is, the separate signals must be closely aligned in phase to minimize destructive interference. To achieve reasonable efficiency, coherent signal combination must be possible with no delay at the "pre-detection" level—that is, when signals collected by individual cells are too weak to be extracted alone. For a traditional, single-aperture observing system, that means the collecting surface must be built to a shape that is exact to within a fraction of the shortest observed wavelength.

This is sometimes taken to imply that the geometry of any radio imaging system must be controlled to within a fraction of a radio wavelength. Happily, that is not the case for our cellular array. Since we can sample and record radio signals for later realignment the distribution of the sensing elements can be arbitrary, within broad limits. The cellular array is simply a multi-element interferometer. Even so, without additional information it will require a lengthy correlation search to find the proper offsets to align all signals in phase, a step that is impractical for a system with many discrete elements. To combine multiple weak signals instantaneously for near-real-time use we require independent knowledge (not control) of the relative positions of each sensing element, as well as their relative clock offsets and instrumental phase biases, to within a fraction ($<\frac{1}{10}$) of a wavelength. No cellular RH imaging system can work efficiently without a fast means of coherently combining the sampled signals from many elements.

With RF observing wavelengths of 20-100 cm, we require continuous knowledge of these quantities to ~2 cm (<0.1 nsec in light-time offset) to achieve instant coherent combining from distributed sensors. CICERO has the means to achieve this with margin to spare. Precise real-time differential GNSS positioning techniques devised in recent years at JPL (in part by the present inventor) and elsewhere allow us to do just that [25]. Space does not allow a full account of the methods employed; suffice to say that these techniques are now in routine operation providing <2 cm orbit accuracy in near real time for a variety of NASA satellites, including Jason-1, Jason-2, GRACE, and IceSat—using GPS alone. The full-sky GPS/Galileo observations by CICERO cells will improve this to <1 cm. However, no previous observing system design has incorporated such precise orbit and clock estimations techniques for supporting blind, instantaneous, coherent combining of RF signals acquired from arbitrarily distributed observing points. That is a critical innovation of the cellular RH concept. Centimeter-level near-real-time GNSS-based POD is the key that makes the technique practical for diverse forms of radar imaging with large numbers of independent, sparsely distributed, free-flying observing cells. As noted in the Background section, with this ability to quickly determine relative positions, clock offsets, and instrumental biases to 1 cm, a number of the earlier patented techniques for rapid SAR processing cited herein are not required.

Summary:

The innovation here is the concept of cellular radio holography, in which the energy received at many RF elements on each cell is sampled and preserved, together with the observation that precise GNSS-based positioning and timing offers a practical approach to coherently combining the RF observations from many free-flying cells. This allows the data collected by the elements of individual cells to be recombined arbitrarily, in real time or after the fact, and the data from multiple cells to be further combined to realize a great diversity of sensing functions at high sensitivity and resolution from a single low-cost array. The full gain of individual cells can be directed to any number of points at once, even retrospectively. Any point on Earth, past or present, can be selected for imaging, monitoring, target detection, and other forms of analysis, without our having had to direct the system toward any particular point at the time of acquisition. Virtually the entire surface of the Earth, as well as the atmosphere and ionosphere, can be observed continuously with a unified constellation in low orbit.

Part 5. The CICERO Cell Configuration and System Design

This section provides more specifics on the CICERO cell configuration and how it will be deployed in an operational cellular RH observing system. Although global RH can be performed with the ambient signals already present—received directly from their sources or reflected from the surface—we can enhance the observing power substantially by broadcasting additional radar signals from CICERO cells, as shown in FIG. 29. These signals can be emitted over a wide angle from elements on the bottom of each cell. The resulting reflections can then be received by both the transmitting cell and by all other cells in view, again distinguished by their unique codes. For an N-cell system, if on average M cells can see the reflections from each cell's transmissions, this will add NM strong detections, opening up other new possibilities for Earth sensing.

FIG. 30 shows additional features of the generic CICERO cell, including the nominal diameter of ~1 m, the bottom-side radar antenna, and the main fore and aft RO antennas. We note that the side-looking patch arrays can all acquire occulting GNSS signals, but because of the rapid motion of the cell along its nominal velocity vector, the great majority of GNSS occultations will occur within the fore and aft antenna fields of view. There are three further enhancements we will add to complete the full CICERO functional design: (a) enhanced high-low GNSS links, (b) full-circle side-looking crosslinks, and (c) standardized sensor expansion port. These are described below.

(a) Enhanced High-Low GNSS Links

EGO gravity sensing can be further improved by strengthening our ability to observe the vertical motions of each cell. While the crosslinks over an extended arc of cells give us a good start on this, we can do better with one simple enhancement: boosting the gain of the up-looking GNSS antenna. We can in fact make these "high-low" GNSS links rival the crosslinks in precision by using the cell's top surface as a high-gain GNSS antenna made up of an array of L-band patch antennas, as illustrated in FIG. 31. If the signals received at each element of the array are combined simultaneously in N different ways, we can form N concurrent beams directed at N different GNSS satellites, each having the full gain of the entire array. For the cell dimension shown, this will provide roughly 18 dB of added gain. Along with planned 3 dB increases in GPS and Galileo signal strength by 2013, this will improve the GNSS phase measurement precision from ~0.5 mm with conventional GPS antennas today to about 5 μm. This in turn will further improve EGO gravity recovery.

(b) Full-Circle System-Wide Crosslinks

Up to this point the crosslink antennas have faced only fore and aft to engage with cells in a common (or nearly common) orbit plane. Here we add crosslinks on all edges to connect with cells in all directions, as illustrated in FIG. 32. This will broaden the coverage and remove the restriction of crosslink occultations to cells in opposing orbits. Perhaps more importantly, it will allow full cross-communication throughout the array, opening up many possible new functions. For our conceptual spacecraft this requires six additional side-looking XO antennas, as illustrated in FIG. 33. Various alternative approaches are possible, such as a single crosslink antenna steerable over 360° extending above or below the spacecraft.

This full-network cross-communications offers far more than occasional out-of-plane crosslink occultations. It enables full system autonomy from launch to de-orbit and extends the range of possible applications into new realms. The autonomy of the system is central to its cost-efficiency. In principle, cells will require no uplink contact from the time of launch until the end of their operational lives. Through GNSS, each cell will always know the time, its own orbit and attitude, and all GNSS orbits, and will be able to schedule observations and downloads, maintain orbits, and plan and execute its entire mission. The data crosslinks allow exchange of cell orbits, health, and other critical information, which in turn will allow auto-scheduling of XO events and the precise orbit maintenance required by the various EGO-XO modes. Full-network connectivity will further allow CICERO to serve as a global data and messaging service and as a user positioning and surveillance service.

Sketches of a conceptual CICERO cell layout offering all required links—a high-gain upward-looking GNSS antenna, full-circle crosslinks, limb and nadir-pointing L-band patch antenna arrays, and a nadir-pointing radar transmitting antenna—are shown in FIG. 34. It may be questioned whether sufficient space for solar cells has been allotted. Though that's not clear from the conceptual design, if that should prove to be an issue the power system can be augmented with one or more foldout solar panels as illustrated in FIG. 35, at some cost in mass and volume.

(c) Standardized Sensor Expansion Ports

As powerful as RF/microwave sensing with CICERO will be, it will not satisfy all observational needs. The miniaturization revolution is making many other types of sensors small enough (in many cases less than 1 kg and a few watts) to fit comfortably within the CICERO cell envelope. With an infrastructure of dozens or hundreds of cells on orbit it will be attractive to open CICERO up for additional or alternative sensors on individual cells. The possibilities are rich and diverse, and include space environment sensors, scalar and vector magnetometers, ion photometers, small-aperture optical and infrared imagers, microwave radiometers, and laser corner reflectors, among others.

The opportunities for powerful synergies with payloads of opportunity can hardly be overlooked. In the world of personal computers, standardized hardware and software interfaces (e.g., SCSI, PCM, USB) allow plug-and-play expansion to many other devices on the same hardware base. CICERO will adapt one or more of these standards and publish technical constraints and design rules to enable third parties to prepare candidate sensors for quick installation and operation on one or more cells. By this means the baseline CICERO array can serve as a low-cost substrate for a limitless variety of complementary sensors.

On-Orbit Computing Power

A full CICERO constellation will collectively possess on the order of $10^{**}6$ MIPS of un-tapped, discretionary processing power—a veritable Grid computer in space. This power along with full inter-cell connectivity can be exploited in myriad ways to optimize and extend performance, reduce data volume, generate quick-look science products on orbit for direct broadcast, support global messaging, and provide other real-time user services. For example, by adding a modest resolution optical imager CICERO will be able to detect developing storms autonomously and alter its formation (shift cells within a plane) to improve sampling. CICERO will quickly evolve into a self-directed, self-modifying, self-optimizing system for global observation and communication.

Frequency Choices

There are many possible frequency choices for CICERO, both for passive sampling of ambient signals and for active radar transmission. For the system to be practical we must limit these choices considerably. The choice for the passively sampled bands is evident. Within a few years there will be at least 90 GNSS satellites (GPS, Galileo, Glonass) bathing the earth in L-band signals, all of them in the same relatively narrow 20 MHz bands known as L1 (at ~1.23 GHz), L2 (at ~1.58 GHz), and L5 (at ~1.18 GHz). These may later be joined by the signals from a Chinese GNSS array. These will provide direct and reflected signals of such abundance and ideal structure that they cannot be passed up. At a minimum, the L1 and L2 bands must be sampled.

L-band is also an inviting option for radar transmission. Many L-band space radars have flown and others will follow. It is an excellent choice for applications ranging from SAR imaging and InSAR to surface altimetry and scatterometry. Again we will require at least two frequencies to facilitate correction for ionospheric effects. To avoid interference and allocation issues, these should not be the same GNSS frequencies, but it will simplify the system design—antenna elements and electronics—to choose them in the vicinity of the GNSS bands. Those are merely practical considerations. As technology and resources permit, one might want to add both higher (e.g., C-band) and lower (e.g., 100-1000 MHz) frequencies to further extend the range of applications.

Summary:

We have described an integrated architecture for a practical cellular Earth observing system that realizes much of the potential of the cellular paradigm described in stage 1. Each cell does essentially two things: emit and receive radio and microwave signals. There is hardly a more robust, economical, or universal technology known than radio, which is the foundation of today's wireless world. With modern high-density circuit integration and thin-film antenna and solar cell technology, the electronics and other subsystems required for CICERO can fit within a compact 60-kg package. The basic functions of each cell are no more demanding technically than those of an iPhone or Blackberry. Yet collectively an array of dozens of such cells in low orbit will be able to perform an almost limitless variety of observing functions.

CONCLUSION

We have described a novel concept for a space-based cellular Earth observing system comprising a fleet of small free-flying cells in low Earth orbit. Each cell performs relatively primitive functions, primarily involving the emission, reception, sampling, and recording of radio and microwave signals. In its fullest form, each cell observes over a full spherical field, samples the received signals independently at many small antenna elements, and stores them so that the cell may be refocused after the fact on any point in view. The recorded data from all cells are sent to a central location (or many) where they can be combined and processed in unlimited ways to realize diverse observing functions.

The concept is described in five principal stages:

1. The fundamental concept of a space-based cellular observing system built on GNSS RO as its core functions;
2. A specific cellular approach to Earth gravity field mapping by means of spread spectrum crosslinks between multiple cells, enhanced by multi-link closures;
3. A complementary cellular architecture for crosslink radio occultation exploiting the same cell design as (2) together with specially tailored orbit configurations;

4. The fundamental concept of global radio holography with a large cellular array;
5. An efficient, practical, integrated system design for a cellular Earth observing system realizing the full range of possibilities for the cellular observing concept.

Among the functions that can be performed with the cellular system described here are:

Continuous global 3D ionospheric mapping;
Continuous mapping of Earth's gravity field with unrivalled accuracy and resolution;
GNSS radio occultation of the atmosphere based on signal bending;
High-frequency crosslink occultation based on both bending and absorption;
Global ocean, ice, and land altimetry;
Global ocean scatterometry;
Synthetic aperture radar imaging;
Interferometric SAR sensing of subtle changes in land topography;
Radar sensing of land cover, canopy height, and geological surface properties;
Global messaging and data services.

The benefits of the cellular approach to Earth observation include:

Greatly reduced system cost;
Continuous observation of the entire earth from low altitude;
Improved performance from many concurrent observations;
Robustness, simplicity, and standardization of observing cells;
Great diversity of Earth observations from a single integrated system;
Consolidation of GEO and LEO functions in an integrated observing system;
Ability to focus the full system observing power and resolution on selected points long after the raw data have been acquired;
Preservation of signal information for future observing applications not yet devised;
Enormous system computing power for on-orbit processing and product generation;
Limitless opportunities for sensor diversification with standardized expansion ports;
Potential synergistic applications like messaging and data services and real-time streaming of data products from orbit.

REFERENCES 1. http://www.infoterra.de/terrasar-x.html
2. http://www.telespazio.it/cosmo.html
3. http://www.digitalglobe.com/
4. http://www.geoeye.com/CorpSite/
5. http://www.rapideye.com/
6. http://www.cosmic.ucar.edu/
7. National Research Council, *Earth Science and Applications from Space: National Imperatives for the Next Decade and Beyond*, The National Academies Press, ISBN-10: 0-309-10387-8, January 2007, 456 pp. (www.nap.edu/catalog.php?record_id=11820)
8. ESA, Missions Observing the Earth, www.esa.int/esaEO/SEM9JP2VQUD_index_0_m.html
9. Report on ESA's Earth Observation Envelope Programme, described at www.esa.int/esaEO/SEMX8Y3J2FE_index_0.html
10. http://www.nasa.gov/mission_pages/ostm/main/index.html
11. http://winds.jpl.nasa.gov/missions/quikscat/index.cfm
12. http://icesat.gsfc.nasa.gov/
13. http://en.wikipedia.org/wiki/Field-programmable_gate_array
14. http://goespoes.gsfc.nasa.gov/
15. Yunck, T. P., C.-H. Liu and R. Ware (2000), A history of GPS sounding, in Lee, L., C. Rocken and E. Kursinski, eds. (2000), *Applications of Constellation Observing System for Meteorology, Ionosphere & Climate*, Springer-Verlag, ISBN 962-430-135-2, pp. 1-20.
16. Kursinski, E. R., G. A. Hajj, K. R. Hardy, J. T. Schofield, and R. Linfield (1997), Observing Earth's atmosphere with radio occultation measurements, *J. Geophys. Res.*, 102(D19): 23429-23465.
17. Gleason, S. et al., Processing of bistatically reflected GPS signals from low Earth orbit for the purpose of ocean remote sensing, IEEE Transactions on Geoscience and Remote Sensing, Vol. 43, No. 6, pp. 1229-1241, June 2005.
18. http://www.csr.utexas.edu/grace/
19. http://www.esa.int/esaNA/galileo.html
20. http://www.spaceandtech.com/spacedata/constellations/glonass_consum.shtml
21. http://www.spacex.com/
22. E. R. Kursinski et al., Active Temperature, Ozone and Moisture Microwave Spectrometer (ATOMMS), Response to NRC Decadal Survey RFI, 2005 (available at http://www.atmo.arizona.edu/~kursinsk/NextGenOccEarth.htm).
23. E. R. Kursinski, S. Syndergaard, D. Flittner, D. Feng, G. Hajj, B. Herman, D. Ward, T. Yunck, A microwave occultation observing system optimized to characterize atmospheric water, temperature and geopotential via absorption, Journal of Atmospheric and Oceanic Technology, December 2002 (available at http://www.atmo.arizona.edu/~kursinsk/NextGenOccEarth.htm).
24. G. Kirchengast, S. Schweitzer and F. Ladstaedter, ACCURATE—Observing Greenhouse Gases, Isotopes, Wind, and Thermodynamic Variables by Combined MW Radio and IR Laser Occultation, presentation at OPAC-3, September 2007 (avail. at http://wegc24.uni-graz.at/OPAC3/m_scientific_programme.php?day=4).
25. T. P. Yunck, Orbit Determination, in *Global Positioning System—Theory and Applications*, B. Parkinson and P. Axelrad, eds., AIAA book, 1995.
26. J.-P. Luntama, Radio Occultation Soundings in Ionosphere and Space Weather Applications: Achievements and Prospects, Presented at OPAC-3, 2007 (available at http://wegc24.uni-graz.at/OPAC3/m_scientific_programme.php?day=1).
24. See Space Weather link at http://geooptics.com/.

What is claimed is:

1. A system for generating a set of Earth observations comprising:
a constellation of at least three satellites, wherein:
(i) each satellite in the constellation of satellites individually includes:
a Global Navigation Satellite System (GNSS) antenna to receive a GNSS signal;
(ii) at least two satellites in the constellation of satellites individually include:
a first crosslink antenna that points in a first direction, wherein a first crosslink module feeds a first received signal from the first crosslink antenna to a digital signal processor; and a second crosslink antenna that points in a second direction opposite the first direction,
wherein a second crosslink module feeds a second received signal from the second crosslink antenna to the digital signal processor; and
(iii) each satellite in the constellation of satellites individually includes a down-looking receiving antenna;
wherein the first crosslink module is programmed to conduct an encoding of a first transmission signal for transmission in the first direction;
wherein the second crosslink module is programmed to conduct an encoding of a second transmission signal for transmission in the second direction;
wherein the encoding of the first transmission signal and the encoding of the second transmission signal use a unique code;
wherein the unique code is unique to the satellite; and
wherein the system processes recorded data from the constellation of at least three satellites to generate the set of Earth observations;
wherein the system determines a first distance and a second distance using the GNSS signal, the first transmission signal, and the second transmission signal; and
wherein at least one Earth observation in the set of Earth observations is derived from the first distance and the second distance.

2. The system of claim 1, wherein the digital signal processor is programmed to:
distinguish the first received signal from a third received signal received from the first direction based on a second code; and
distinguish the second received signal from a fourth received signal received from the second direction based on a third code.

3. The system of claim 2, wherein:
the unique code, the second code, and the third code are pseudonoise spread spectrum codes;
the third code and the second code are different; and
the encoding modulates the unique code with the first transmission signal and the second transmission signal.

4. The system of claim 1, wherein:
the unique code is a pseudonoise spread spectrum code; and
the encoding modulates the pseudonoise spread spectrum code with the first transmission signal and the second transmission signal.

5. The system of claim 1, wherein:
the first crosslink module feeds a third received signal from the first crosslink antenna to the digital signal processor; and
the digital signal processor is programmed to:
determine an amplitude of the third received signal; and
set a frequency of the first transmission signal to target a Radio Frequency (RF) absorption line of a first species in the atmosphere.

6. The system of claim 5, at least one satellite in the constellation of satellites further comprising
a first Global Navigation Satellite System Radio Occultation (GNSS-RO) antenna that points in the first direction, wherein a first GNSS front end module feeds a fourth received signal from the first GNSS-RO antenna to the digital signal processor.

7. The system of claim 5, where the digital signal processor is programmed to:
conduct a precise orbit determination using the GNSS signal received on the upward-looking GNSS antenna;
determine a first relative velocity to a second satellite using the first received signal; and
determine a second relative velocity to a third satellite using the second received signal.

8. The system of claim 5, wherein:
the first crosslink module is programmed to:
(i) conduct an encoding of a third transmission signal for transmission in the first direction; and
(ii) set a frequency of the third transmission signal to target a second RF absorption line of a second species in the atmosphere;
the first RF absorption line is 22.7 GHz; and
the first species is water.

9. The system of claim 1, wherein:
the second received signal and the first transmission signal share a first frequency;
the first received signal and the second transmission signal share a second frequency; and
the first frequency and the second frequency are different.

10. The system of claim 1, at least one satellite in the constellation of satellites further comprising:
a first means for measuring a relative velocity variation which operates in the first direction; and
a second means for measuring a second relative velocity variation which operates in the second direction.

11. The system of claim 1, wherein:
the first crosslink module feeds a first set of received signals from the first crosslink antenna to the digital signal processor;
the second crosslink module feeds a second set of received signal from the second crosslink antenna to the digital signal processor;
the digital signal processor includes a set of processing channels to simultaneously process the first set of received signals and the second set of received signals; and
the first and second sets of received signals each includes greater than three signals.

12. The system of claim 1, each satellite in the constellation of satellites further comprising:
an accelerometer;
wherein the memory stores the output of the accelerometer.

13. A system for generating a set of Earth observations, comprising:
a constellation of at least three satellites, wherein:
(i) each satellite in the constellation of satellites individually includes
a Global Navigation Satellite System (GNSS) antenna to receive a GNSS signal;
(ii) at least two satellites in the constellation of satellites individually include
a first crosslink antenna that points in a first direction,
wherein a first crosslink module feeds a first received signal from the first crosslink antenna to a digital signal processor; and
a second crosslink antenna that points in a second direction opposite the first direction,
wherein a second crosslink module feeds a second received signal from the second crosslink antenna to the digital signal processor; and (iii) each satellite in the constellation of satellites individually includes
a down-looking receiving antenna
wherein the first crosslink module is programmed to:
(i) conduct an encoding of a first transmission signal for transmission in the first direction using a first code; and
(ii) distinguish the first received signal from a third received signal received from the first direction based on a second code;
wherein the second crosslink module is programmed to:
(i) conduct an encoding of a second transmission signal for transmission in the second direction using the first code; and
(ii) distinguish the second received signal from a fourth received signal received from the second direction based on a third code;
wherein the first code is a unique code that is unique to the satellite;
wherein the system processes recorded data from the constellation of at least three satellites to generate the set of Earth observations; and
wherein the recorded data is derived from the first transmission signal and the second transmission signal.

14. The system of claim 13, wherein:
the unique code is a pseudonoise spread spectrum code; and
the encoding modulates the pseudonoise spread spectrum code with the first transmission signal and the second transmission signal.

15. The system of claim 13, wherein:
the first crosslink module feeds the third received signal from the first crosslink antenna to the digital signal processor; and
the digital signal processor is programmed to:
determine an amplitude of the third received signal; and
set a frequency of the first transmission signal to target an RF absorption line of a first species in the atmosphere.

16. The system of claim 15, at least one satellite in the constellation of satellites further comprising:
a first GNSS RO antenna that points in the first direction, wherein a first GNSS front end module feeds a fifth received signal from the first GNSS-RO antenna to the digital signal processor.

17. The system of claim 15, where the digital signal processor is programmed to:
conduct a precise orbit determination using the GNSS signal received on the upward-looking GNSS antenna;
determine a first relative velocity to a second satellite using the first received signal; and
determine a second relative velocity to a third satellite using the second received signal.

18. The system of claim 15, wherein:
the first crosslink module is programmed to:
(i) conduct an encoding of a third transmission signal for transmission in the first direction; and
(ii) set a frequency of the third transmission signal to target a second RF absorption line of a second species in the atmosphere;
the first RF absorption line is 22.7 GHz; and
the first species is water.

19. The system of claim 13, wherein:
the second received signal, the fourth received signal, and the first transmission signal share a first frequency;
the first received signal, the third received signal, and the second transmission signal share a second frequency; and
the first frequency and the second frequency are different.

20. The system of claim 13, at least one satellite in the constellation of satellites further comprising:
a first means for measuring a relative velocity variation which operates in the first direction; and
a second means for measuring a second relative velocity variation which operates in the second direction.

21. The system of claim 13, wherein:
the first crosslink module feeds a first set of received signals from the first crosslink antenna to the digital signal processor;
the second crosslink module feeds a second set of received signal from the second crosslink antenna to the digital signal processor;
the digital signal processor includes a set of processing channels to simultaneously process the first set of received signals and the second set of received signals; and
the first and second sets of received signals each includes greater than three signals.

22. The system of claim 13, at least one satellite in the constellation of satellites further comprising:
an accelerometer;
wherein the memory stores the output of the accelerometer.

23. A system for generating a set of Earth observations, comprising:
a constellation of at least three satellites, wherein:
(i) each satellite in the constellation of satellites includes
a Global Navigation Satellite System (GNSS) antenna to receive a GNSS signal;
(ii) at least two satellites in the constellation of satellites individually include
a first crosslink antenna that points in a first direction, wherein a first crosslink module feeds a first received signal from the first crosslink antenna to a digital signal processor; and
a second crosslink antenna that points in a second direction opposite the first direction,
wherein a second crosslink module feeds a second received signal from the second crosslink antenna to the digital signal processor; and
(iii) each satellite in the constellation of satellites individually includes
a down-looking receiving antenna; and
wherein the first crosslink module is programmed to conduct an encoding of a first transmission signal for transmission in the first direction;
wherein the second crosslink module is programmed to conduct an encoding of a second transmission signal for transmission in the second direction;
wherein the system processes recorded data from the constellation of at least three satellites to generate the set of Earth observations; and
wherein the recorded data is derived from the first transmission signal and the second transmission signal.

24. The system of claim 23, wherein:
the encoding modulates the first transmission signal and the second transmission signal with a single pseudonoise spread spectrum code; and
the single pseudonoise spread spectrum code is unique to the satellite.

25. The system of claim 24, wherein:
the first crosslink module feeds a third received signal from the forward-looking crosslink antenna to the digital signal processor; and
the digital signal processor is programmed to:
  determine an amplitude of the third received signal; and
  set a frequency of the first transmission signal to target an RF absorption line of a first species in the atmosphere.

26. The system of claim 25, at least one satellite in the constellation of satellites further comprising:
a first GNSS-RO antenna that points in the first direction, wherein a first GNSS front end module feeds a fourth received signal from first GNSS-RO antenna to the digital signal processor.

27. The system of claim 25, where the digital signal processor is programmed to:
conduct a precise orbit determination using the GNSS signal received on the upward-looking GNSS antenna;
determine a first relative velocity to a second satellite using the first received signal; and
determine a second relative velocity to a third satellite using the second received signal.

28. The system of claim 25, wherein:
the first crosslink module is programmed to:
  (i) conduct an encoding of a third transmission signal for transmission in the first direction; and
  (ii) set a frequency of the third transmission signal to target a second RF absorption line of a second species in the atmosphere;
the first RF absorption line is 22.7 GHz; and
the first species is water.

29. The system of claim 24, wherein:
the second received signal and the first transmission signal share a first frequency;
the first received signal and the second transmission signal share a second frequency; and
the first frequency and the second frequency are different.

30. The system of claim 24, at least one satellite in the constellation of satellites further comprising:
a first means for measuring a relative velocity variation which operates in the first direction; and
a second means for measuring a second relative velocity variation which operates in the second direction.

31. The system of claim 24, wherein:
the first crosslink module feeds a first set of received signals from the first crosslink antenna to the digital signal processor;
the second crosslink module feeds a second set of received signal from the second crosslink antenna to the digital signal processor;
the digital signal processor includes a set of processing channels to simultaneously process the first set of received signals and the second set of received signals; and
the first and second sets of received signals each includes greater than three signals.

32. The system of claim 24, at least one satellite in the constellation of satellites further comprising:
an accelerometer;
wherein the memory stores the output of the accelerometer.

* * * * *